Figure 1:
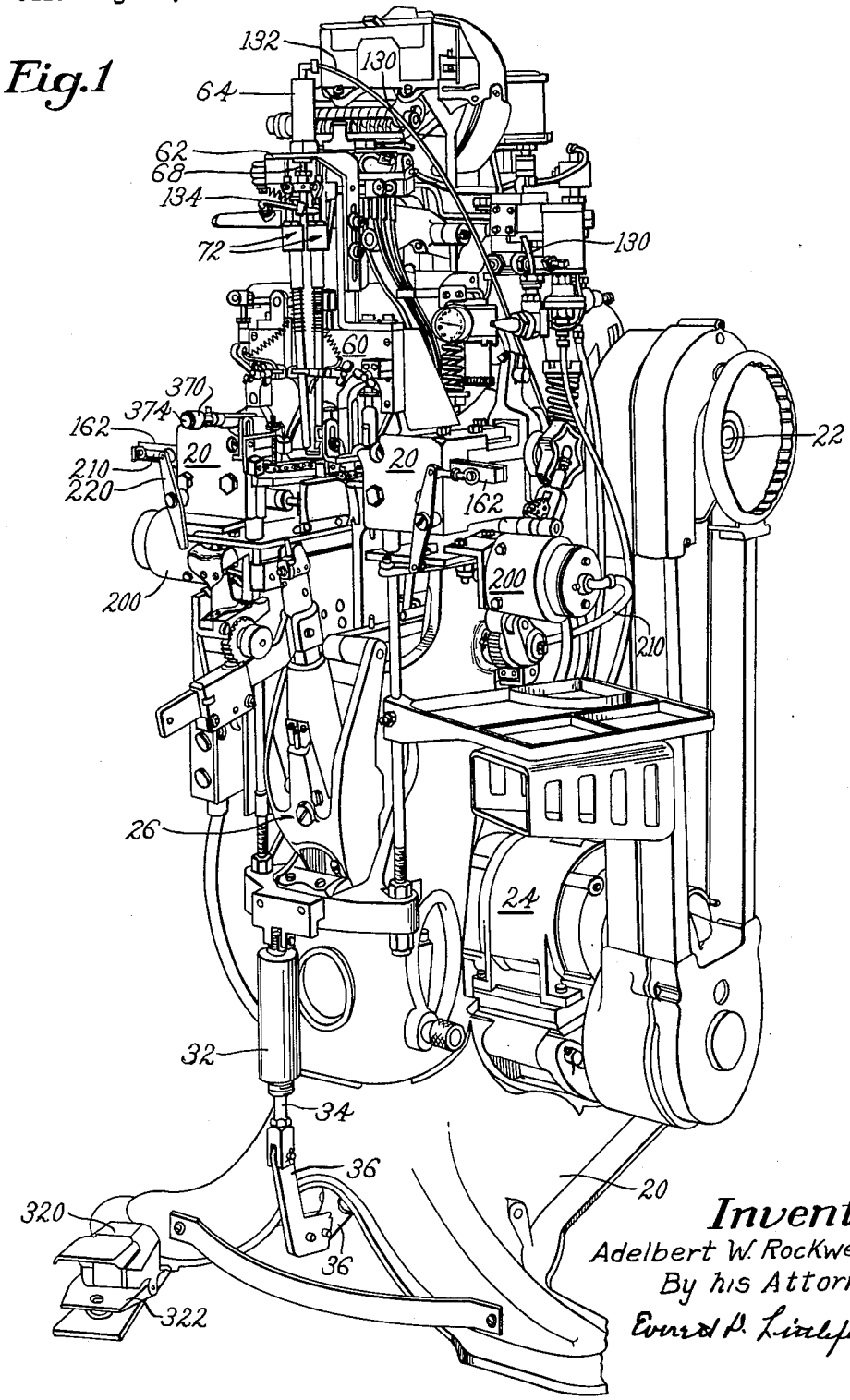

March 26, 1963   A. W. ROCKWELL, JR   3,082,448
HEEL AND SHANK LASTING MACHINES
Filed Aug. 23, 1961   12 Sheets-Sheet 1

Inventor
Adelbert W. Rockwell, Jr.
By his Attorney

March 26, 1963    A. W. ROCKWELL, JR    3,082,448
HEEL AND SHANK LASTING MACHINES
Filed Aug. 23, 1961    12 Sheets-Sheet 3

March 26, 1963 A. W. ROCKWELL, JR 3,082,448
HEEL AND SHANK LASTING MACHINES
Filed Aug. 23, 1961 12 Sheets-Sheet 4

March 26, 1963    A. W. ROCKWELL, JR    3,082,448
HEEL AND SHANK LASTING MACHINES
Filed Aug. 23, 1961    12 Sheets-Sheet 5

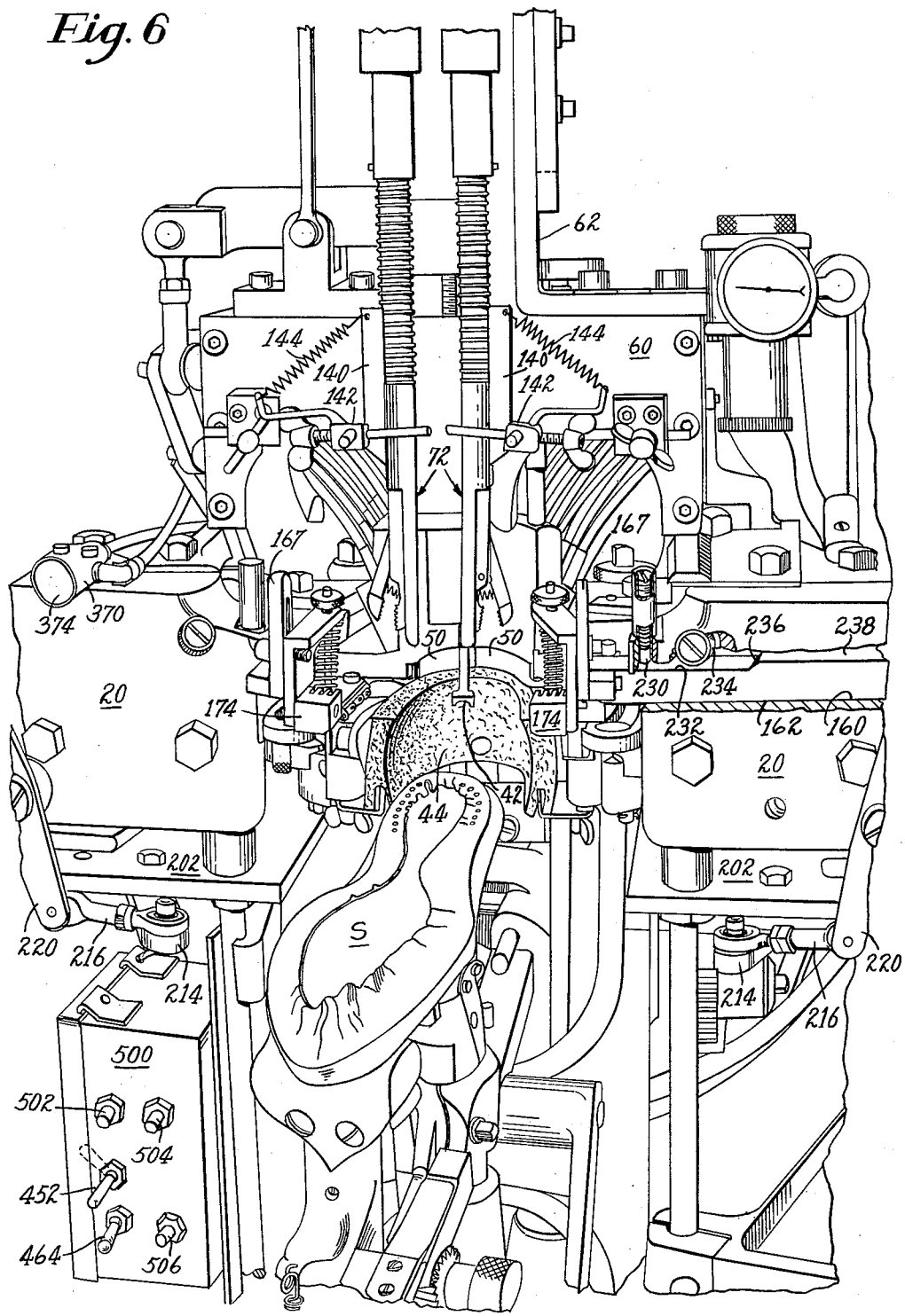

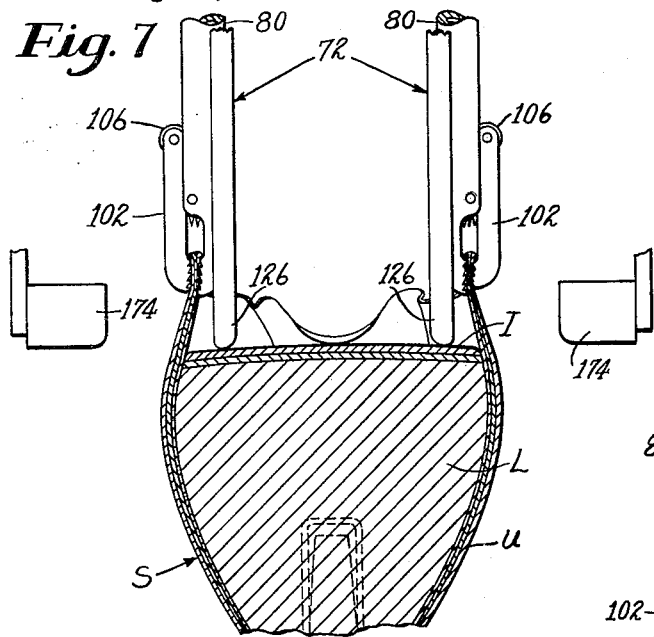
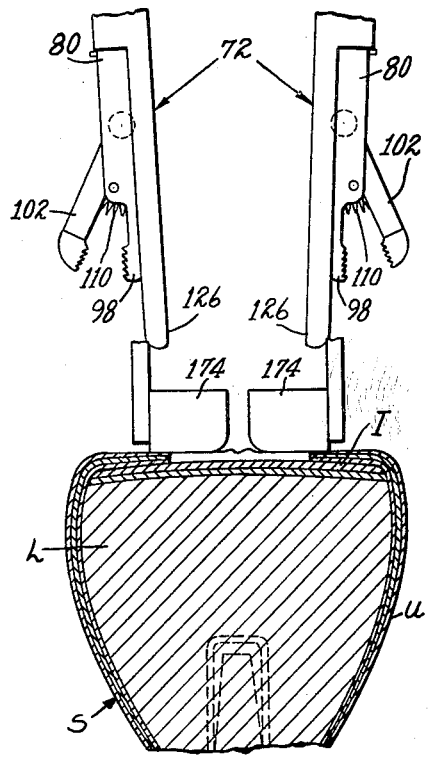
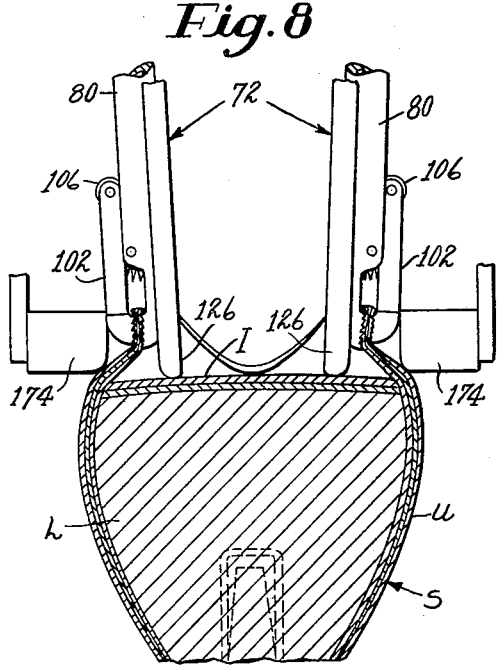

March 26, 1963 A. W. ROCKWELL, JR 3,082,448
HEEL AND SHANK LASTING MACHINES
Filed Aug. 23, 1961 12 Sheets-Sheet 8

March 26, 1963  A. W. ROCKWELL, JR  3,082,448
HEEL AND SHANK LASTING MACHINES

Filed Aug. 23, 1961  12 Sheets-Sheet 9

March 26, 1963  A. W. ROCKWELL, JR  3,082,448
HEEL AND SHANK LASTING MACHINES
Filed Aug. 23, 1961  12 Sheets-Sheet 10

United States Patent Office 3,082,448
Patented Mar. 26, 1963

3,082,448
HEEL AND SHANK LASTING MACHINES
Adelbert W. Rockwell, Jr., Beverly, Mass., assignor to United Shoe Machinery Corporation, Flemington, N.J., a corporation of New Jersey
Filed Aug. 23, 1961, Ser. No. 133,361
27 Claims. (Cl. 12—10.2)

This invention relates to lasting machines, and more particularly to a novel and improved machine for lasting the heel end and shank portions of a shoe. Although herein illustrated as embodied in a heel end lasting machine of the type disclosed in United States Letters Patent No. 1,583,044, issued May 4, 1926, in the name of Charles H. Hoyt, modified in some respects as shown in United States Letters Patent No. 1,770,976, issued July 22, 1930, in the name of Joseph Fausse, it is to be understood that, in its broader aspects, the invention is not limited to embodiment in a heel end lasting machine of that particular type or to the exact mechanical construction shown.

A principal object of this invention is to provide a machine for lasting the upper at the heel end of a shoe and also at the opposite sides of the shank portion of the shoe which is relatively simple and inexpensive to manufacture and yet at the same time is efficient and dependable in operation. With this general object in view, and in accordance with features of the invention, the herein illustrated machine, which comprises usual heel end lasting instrumentalities including, a support for a shoe on its last, a heel band for embracing the heel end of a shoe and operable to press and to shape the upper materials to the heel end of the last, heel end wipers for wiping the lasting margin of the upper materials inwardly over and for pressing it against the heel end of an insole on the last in an automatic operating cycle, power operated means for actuating the heel end lasting instrumentalities, and a control means, such for example as a clutch, for initiating an automatic operating cycle of the heel end lasting instrumentalities, is also provided with shank lasting instrumentalities for tensioning the upper materials at the opposite sides of the shank portion of the shoe and for wiping the lasting margin of the upper materials inwardly over and for pressing them against the bottom of the insole in the opposite shank portions of the shoe, together with power operated means for actuating the shank lasting instrumentalities, and means, preferably fluid pressure operated, responsive to the completion of the actuation of the shank lasting instrumentalities for actuating the control means to initiate an automatic operating cycle of the heel end lasting instrumentalities. More particularly, the heel end lasting instrumentalities may include mechanism for inserting fastenings, such as tacks, through the heel end wipers and into the overlasted margin of the upper materials at the heel end of the shoe during the automatic operating cycle of the heel end lasting instrumentalities, and the shank lasting instrumentalities may comprise a pair of grippers for tensioning the upper materials in two locations on the opposite sides of the shank portion of the shoe and shank lasting wipers including a flexible portion shaped to correspond to the longitudinal curvature of the shank portion of the shoe, and a relatively flat portion extending heelwardly of the shoe being lasted a substantial distance beyond the toeward limit of action of the heel end wipers and being of a width such as to provide space for the toeward portion of the heel end wiper on that side of the shoe to complete its advancing and closing movement.

In accordance with still other features of the invention, the shoe support is mounted for movement from an inoperative position to an operative position by power operated means, and a control means is provided which includes a member movable to two positions, successively, by the operator and adapted, when moved to its first position, to cause the shoe support to be moved to operative position, and when moved to its second position to cause the shank lasting instrumentalities to be actuated. Preferably, and in accordance with still other features of the invention, fluid pressure operated means are provided for moving the shoe support and also for actuating the shank lasting instrumentalities, while for controlling the movements of the shoe support and the actuation of the shank lasting instrumentalities by their respective fluid pressure operated means, an electrical control means, including a member movable by the foot of the operator to two positions, for the purposes mentioned above, is provided.

The above and other objects and features of the invention, including novel means for supporting and guiding the shank wiper carrying slides, will appear in the following detailed description of the preferred embodiment thereof which is illustrated in the accompanying drawings, and will be pointed out in the claims.

Figure 10:
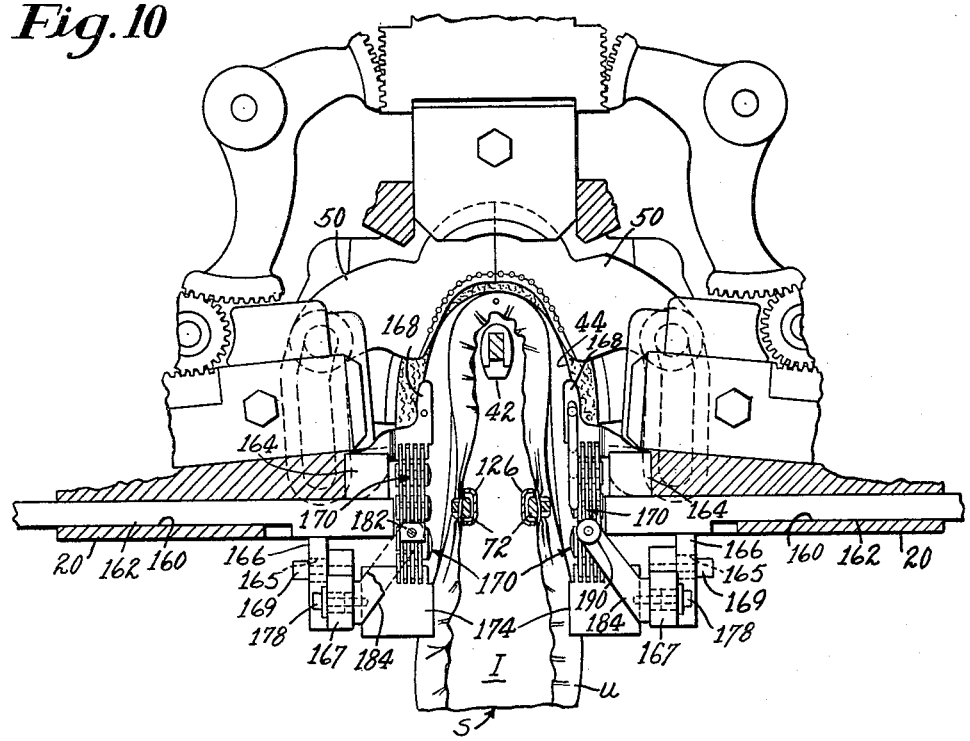
Figure 11:
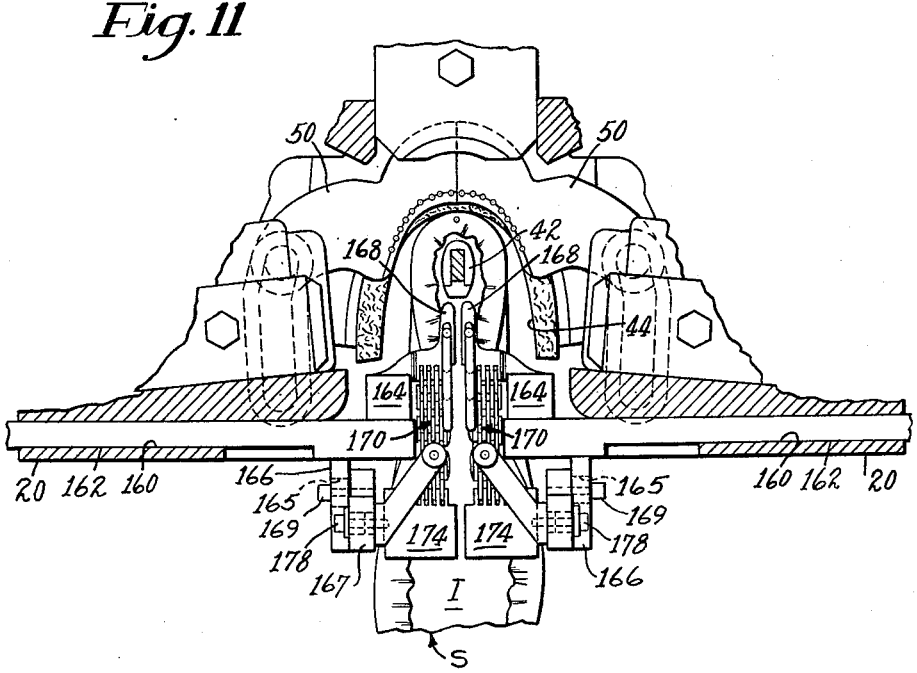
Figure 12:
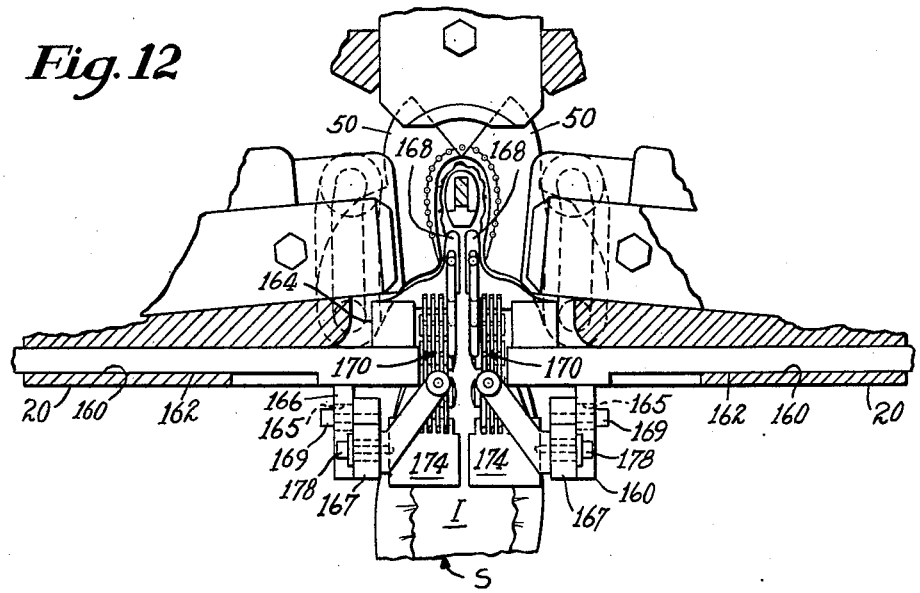
Figure 13:
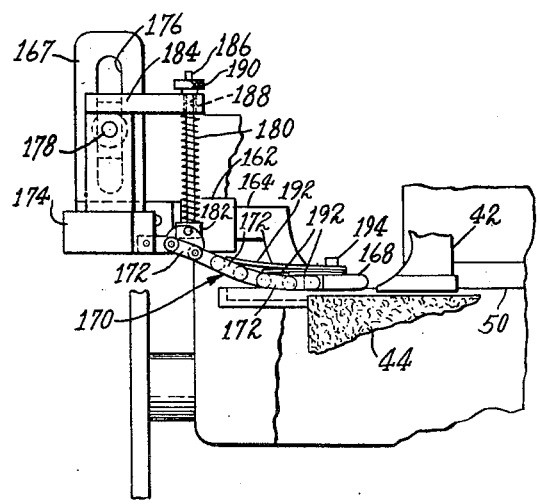
Figure 14:
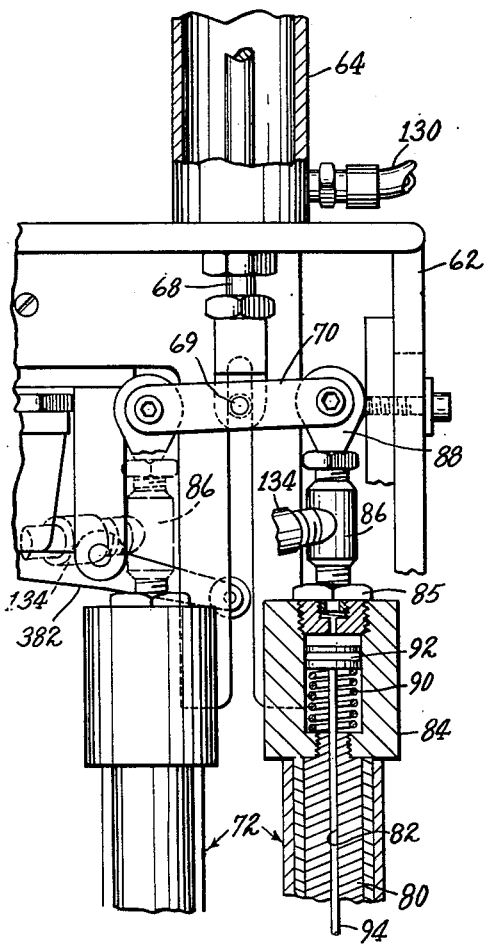
Figure 15:
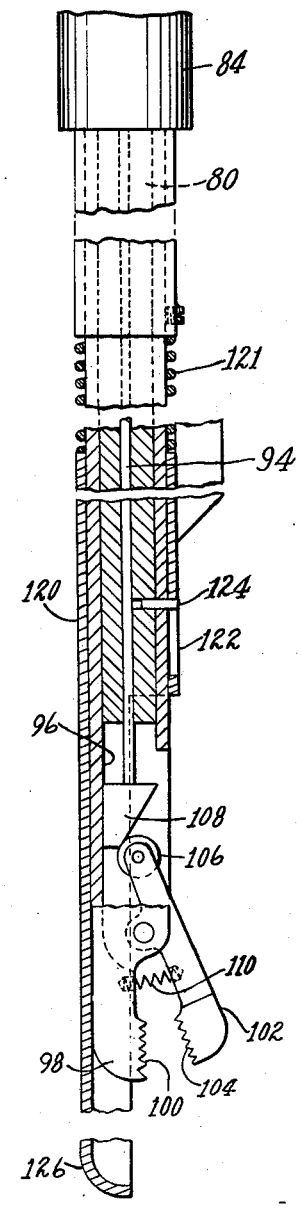
Figure 16:
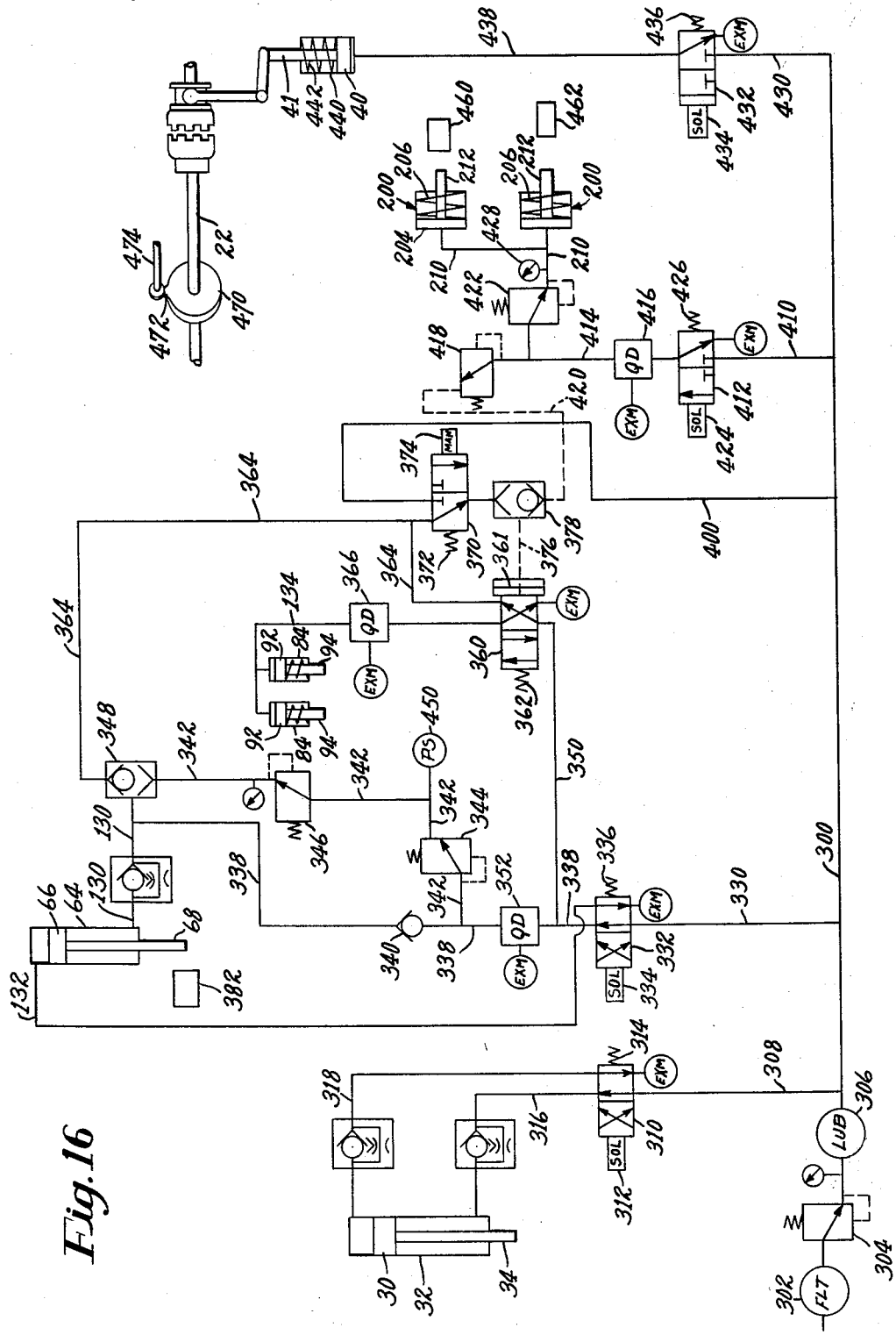
Figure 17:
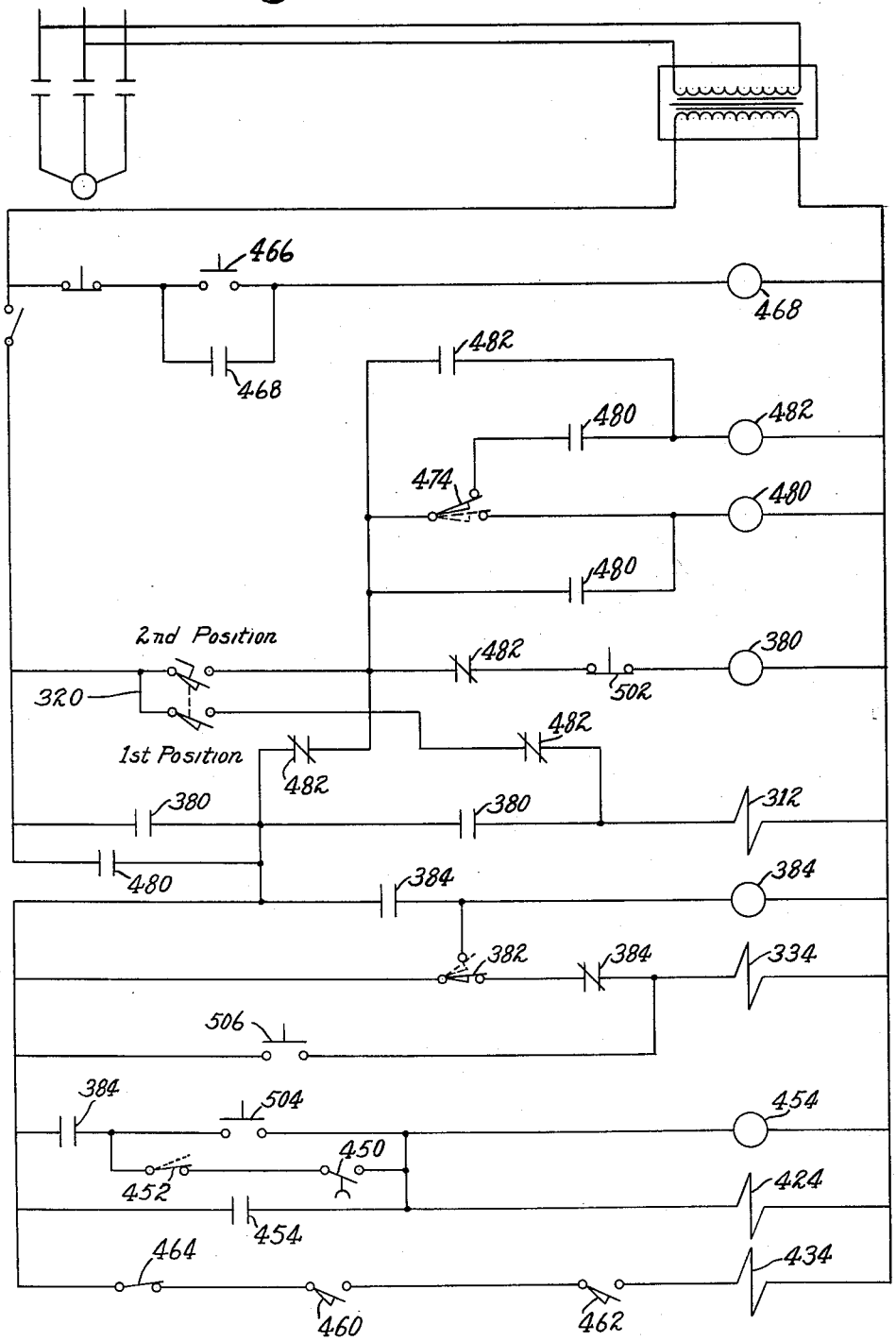

In the drawings,
FIG. 1 is a view in perspective of a heel seat and shank lasting machine embodying the features of this invention;
FIGS. 2 to 6 are views in perspective and at an enlarged scale of a portion of the machine showing the parts in different positions assumed during a complete operating cycle;
FIGS. 7 to 9 are views in front elevation showing the shank grippers and wipers, somewhat schematically and in different positions assumed during the operating cycle of the machine;
FIGS. 10, 11 and 12 are plan views of a portion of the machine with parts broken away and omitted to expose the shank wipers and heel seat wipers, these views showing the mentioned parts in different positions assumed during the operating cycle of the machine;
FIG. 13 is a view in side elevation of one of the shank wipers with portions of other operating elements shown to illustrate the structural relationship of these parts of the machine;
FIG. 14 is a view in front elevation in enlarged scale of a portion of the shank grippers;
FIG. 15 is a view in front elevation with certain parts in vertical section of one of the shank grippers;
FIG. 16 is a schematic drawing of the fluid pressure system associated with the mechanism; and
FIG. 17 is an electrical diagram.

Referring to these drawings, and in particular to FIG. 1 thereof, the machine therein illustrated comprises a heel seat lasting machine of a well-known type, constructed generally in accordance with the disclosure of U.S. Letters Patent to Hoyt No. 1,583,044, and Fausse 1,770,976 mentioned above and to which reference may be made for details of construction not described herein, to which for the purposes of this invention there have been added shank lasting instrumentalities including shank grippers and shank wipers, together with fluid pressure actuated means for operating these instrumentalities and also the shoe supporting jack of the heel seat lasting machine. In common with the machine of this type, the herein illustrated machine includes in its organization heel end wipers and tack handling and driving mechanism for wiping the margin of the upper of a shoe over its heel seat portion and for fastening the upper in lasted position together with means for positioning and holding the shoe for the wiping and tacking operations, comprising a heel embracing a band and a shoe supporting jack which is operated to force the shoe backwardly into the band and upwardly against a holddown. These various heel seat lasting instrumentalities are associated with and operated by mechanism contained within a frame construction indicated generally by the reference character 20, this operating mechanism being similar to that described in detail in the above-mentioned patents and including a clutch, shown diagrammatically in FIG. 16, adapted to couple a main drive shaft 22 to a pulley driven from an electrical motor 24.

As will appear in detail below, in the herein illustrated machine the shoe supporting jack, indicated generally by the reference character 26, is moved initially to operative position by means of a fluid pressure actuated piston 30, FIG. 16, which is contained within a cylinder 32 and which has a piston rod 34 connected to a lever 36, FIG. 1, corresponding to the foot treadle 100 of the Fausse machine, while the clutch of the heel seat lasting machine is arranged to be engaged to initiate the usual automatic operating cycle of the heel seat lasting machine by means of a piston 40, FIG. 16, having a piston rod 41, which corresponds in function to the push rod 32 of the Fausse machine or the push rod 54 of the Hoyt machine; otherwise, except as noted below, the heel seat lasting instrumentalities, including holddown 42 and the heel band 44, heel seat wipers 50, 50, FIGS. 2 and 6, and mechanism for driving tacks through openings in these wipers, operate in exactly the same manner as in the prior patented machines.

Referring to FIGS. 1 to 6, there is secured to an upper part of the frame 20 of the heel seat lasting machine, a plate member 60 on which there is mounted a bracket 62 and supported on this bracket is a cylinder 64, FIG. 14. Slidable within this cylinder is a piston 66, FIG. 16, having a downwardly extending piston rod 68. Pivotally connected on the lower end of this rod is an equalizing lever 70 to the outer ends of which are connected exactly similar shank grippers indicated generally by the reference characters 72, 72, FIGS. 1-6, one of which shank grippers is shown in considerable detail in FIG. 15. Referring particularly to that figure each shank gripper comprises an elongated cylindrical body portion 80 provided with a central bore 82 and having a cylinder 84 threaded on to its upper end, see also FIG. 14. Threaded into an apertured plug 85 in the upper end of each cylinder 84 is the lower end of a T-fitting 86, the upper end of which is connected to the equalizing lever by means of a short link 88. Received within each cylinder 84 and held in the elevated position in which it is shown in FIG. 14 by means of a compression spring 90, is a piston 92 having an elongated piston rod 94 which extends downwardly through the central bore 82 in the gripper body portion 80 and into a slot 96 cut in said body portion.

At its lower portion, below the aforementioned slot, the body portion 80 is shaped to provide a fixed gripper jaw 98 having serrated teeth 100. Pivotally mounted on the body portion is a movable jaw 102 having similar serrations 104 at one of its ends and a roll 106 at its opposite end. Mounted on the lower end of the elongated piston rod 94, within the confines of the slot 96 is a block 108 having an inclined operating surface against which the roll 106 is held by means of a gripper opening spring 110. Slidably mounted on the lower part of the gripper portion is a sleeve member 120 which is held against rotation and also against downward movement on the body portion, in response to the action of a compression spring 121, beyond the position in which it is shown, by means of a slot 122 and a pin 124. Secured to this sleeve and extending downwardly therefrom is an insole holddown 126.

As will presently appear, the grippers 72, 72 are normally held in an elevated position in which they are shown in FIG. 1, see also FIGS. 2, 3, 6 and 8, by means of fluid under pressure admitted to the cylinder 64, beneath the piston 66 through a conduit 130, while the upper portion of this cylinder, above the piston 66 is connected to exhaust through a conduit 132. Also the jaws 102, 102 on these grippers are held in their open positions by the action of springs 110, 110 when the pistons 92, 92 are elevated by springs 90, 90 as the upper portions of the cylinders 84, 84 are connected to exhaust through a common conduit 134, FIG. 16. By introducing fluid under pressure to the upper portion of the cylinder 64 through conduit 132, FIG. 16, and connecting conduit 130 to exhaust the grippers 72, 72 may be moved downwardly to positions in which the insole holddowns 126, 126 are pressed yieldingly against the bottom of a shoe S being lasted by the action of springs 121, 121, which springs are now further compressed as the result of a continued downward movement of the gripper body portions. After the insole holddowns have engaged the shoe bottom, the jaws 102, 102 may be closed to grip the lasting margin of the upper U of the shoe S, shown assembled on a last L together with an insole I by the admission of fluid under pressure to the cylinders 84, 84 above the pistons 90, 90 through the conduit 134. Now by admitting fluid under pressure into the cylinder 64 beneath the piston 66 while exhausting this cylinder through conduit 132, the grippers 72, 72, may be elevated to exert a tensioning pull on the upper at the opposite shank portions of the shoe, see FIG. 7, the insole holddowns 126, 126, however, being held yieldingly against the insole I by springs 121, 121.

Figure 2:
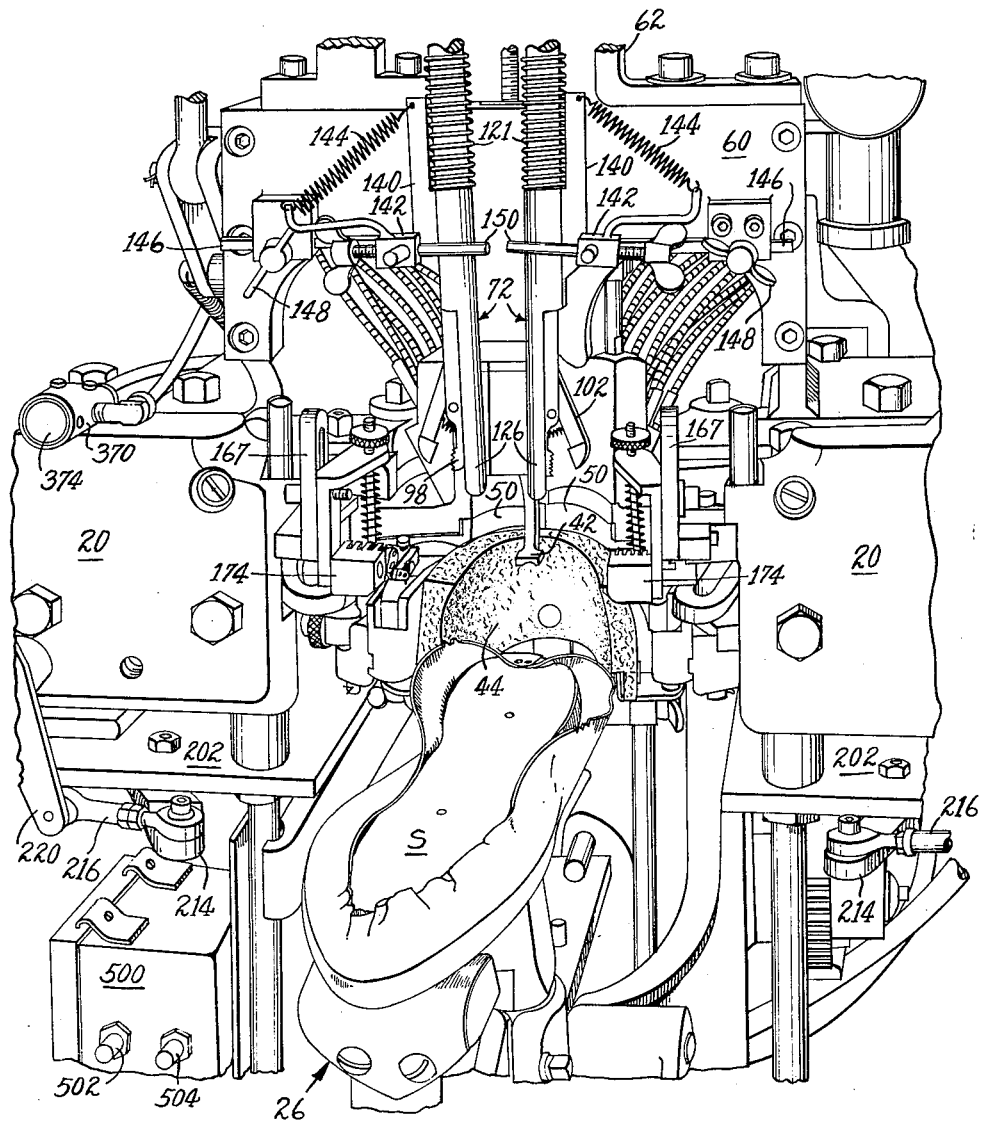
Figure 3:
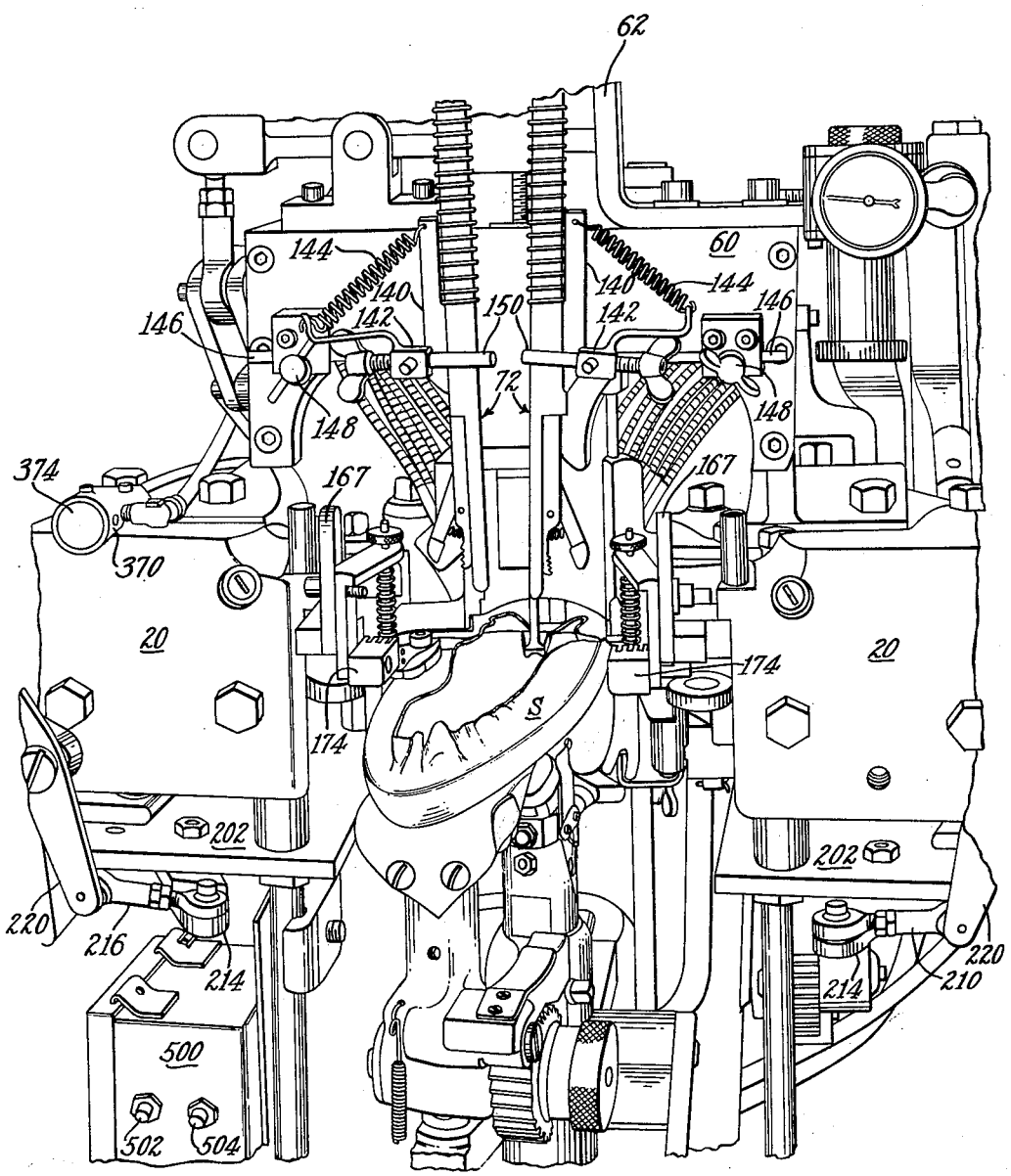
Figure 4:
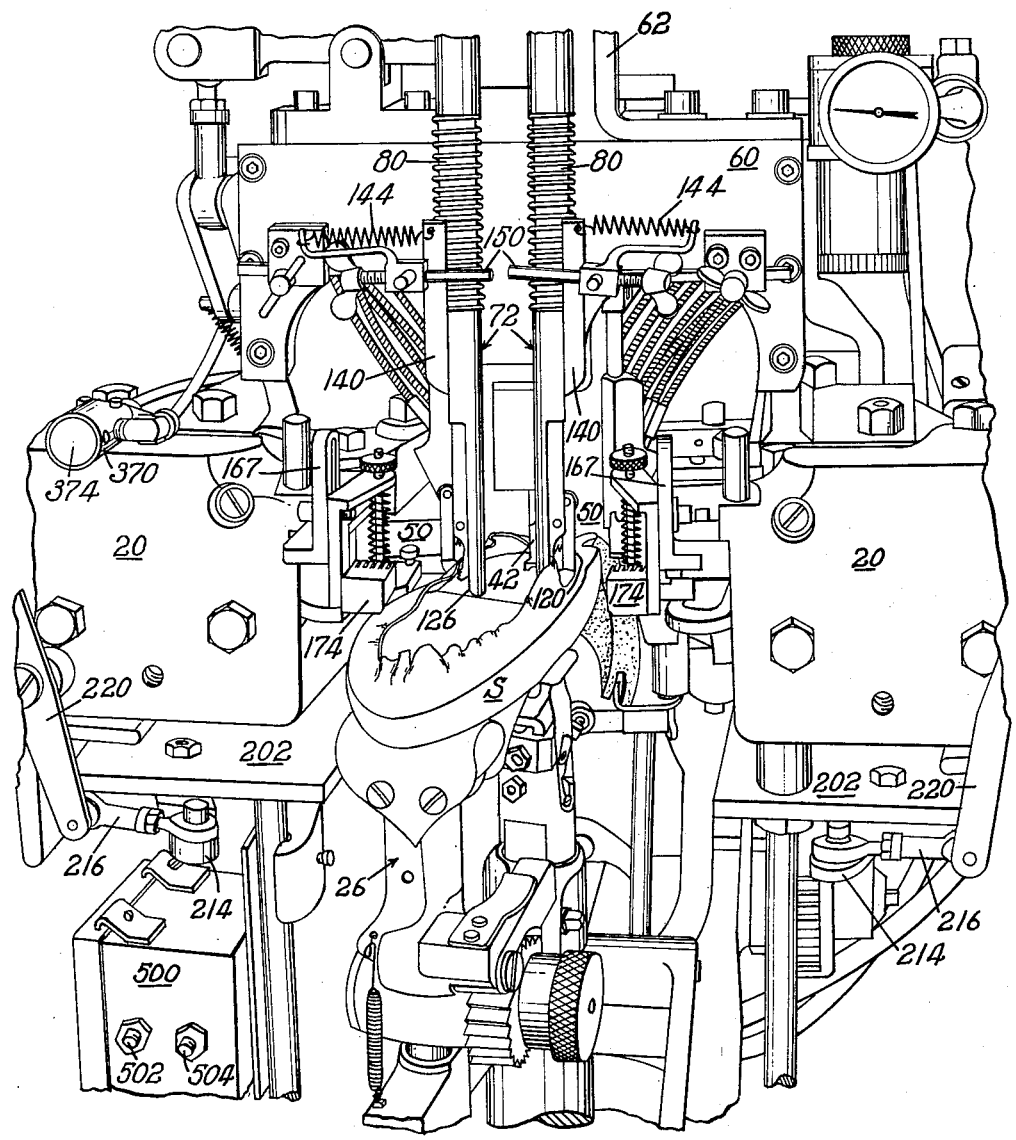
Figure 5:
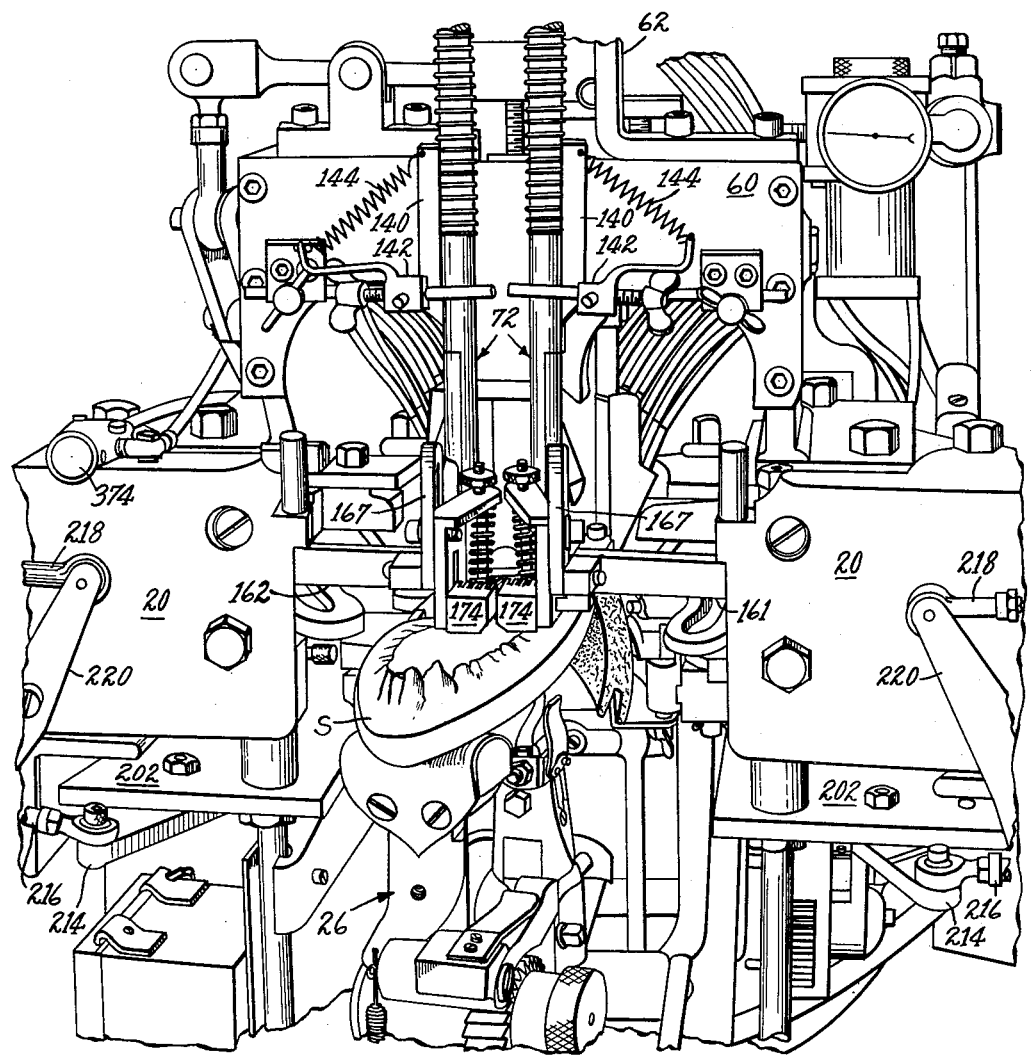

Secured to each of the sleeve members 120 is an elongated plate-like member 140 which extends upwardly along the side of the gripper body 80 and these plate-like members are each held yieldingly against a shouldered guide surface formed on a block 142 by means of a coil spring 144, FIGS. 2 and 6. Each block 142 is adjustably mounted by means of a supporting rod 146 and a thumb screw 148 on the plate 60, mentioned above, and carries a short rod 150 which is disposed in front of the gripper associated with that particular block. With this arrangement, the shank grippers 72, 72 are maintained in a predetermined location, relatively to the marginal edge of the insole of the shoe S being lasted as the grippers are lowered, closed to grip the upper and as they are subsequently elevated to exert their upward pull. However, as will be apparent, the grippers may be swung inwardly against the yieldable resistance of springs 144, 144, by the shank wipers before the gripper jaws are opened to release the upper.

Formed in two spaced-apart and forwardly extending portions of the machine frame 20 are guideways 160, 160 for receiving two slides 162, 162, FIGS. 1, 6, and 10-12. These slides are generally rectangular in cross section and their heightwise dimension is slightly less than that of the guideways. At its inner end, each slide is provided with two integrally formed offset portions 164, 166, FIGS. 10-13. The offset portion 164 of each slide extends downwardly and rearwardly, FIG. 13, to form a fixed shank wiper portion 168, shaped as shown in FIGS. 10-12 and adapted to provide a support for one end of a flexible shank wiper portion 170 which is comprised of a series of bar chain links 172, 172. The other end of the flexible shank wiper portion is supported on a block 174 which forms a second fixed wiper portion. The block 174 is mounted for heightwise adjustment, by means of a slot 176 and clamp screw 178, on an upwardly extending part of a block 167 which is mounted for lengthwise adjustment on the offset portion 166 of the slide by means of a slot 165 and a clamp screw 169, FIGS. 10-13. Adjacent to the end which is supported on the block 174, the flexible shank wiper portion 170 is yieldably supported by a coil spring 180 which is interposed between a cross member 182, secured to specially shaped inner and outer side plates of one of the chain links, and an abutment arm 184 formed integrally with the block 174. Connected to the cross member 182 is an adjusting rod 186 which extends upwardly through a clearance hole 188, formed in the arm 184, where it is threaded to receive an adjusting nut 190. As will be apparent, the heightwise position in which the link 172 carrying the cross member 182 is yieldingly held by the spring 180, may be varied by turning the nut 190 to raise or lower the link. Leaf springs 192, 192, anchored by a screw 194 to the fixed shank wiper portion 168, are arranged to bear yieldingly against other links 172 of the flexible shank wiper portion 170 in the manner shown in FIG. 13. The inermost plates of the several chain links are rounded off as are the fixed shank wiper portion 168 and the fixed wiper portion 174, see FIGS. 7–9, so that the combined shank wiper may smoothly engage and wipe the lasting margin of the upper materials inwardly over the shank portion on one side of a shoe as the slide 162, on which it is mounted, is moved inwardly.

For operating the shank wipers, a pair of fluid pressure actuators, indicated generally by the reference character 200, are provided, see FIG. 1. Each of these fluid pressure actuators is supported on a plate 202, associated with one of the forwardly projecting portions of the machine frame 20, mentioned above, and comprise essentially and as shown diagrammatically in FIG. 16, a cylinder within which there is a piston 204 adapted to be moved in one direction against the resistance of a return spring 206 by fluid under pressure admitted to the actuator through a conduit 210. Operatively connected to a piston rod 212 associated with the piston of each actuator is a lever 214, pivotally mounted on the aforementioned plate 202, FIGS. 2–6, and each of these levers is operatively connected to the outer end of a slide 162 by means including links 216, 218 and an intermediate lever 220, FIGS. 1 and 5. The arrangement is such that when fluid under pressure is admitted to the actuators 200, 200, through conduit 210, the slides 162, 162 will be moved inwardly, see arrows in FIG. 10, thereby causing the shank wipers carried thereby to engage the lasting margin of the upper materials and wipe it inwardly over the opposite shank portions of the bottom of a shoe.

As was mentioned above, each slide 162 is of somewhat less height than its corresponding guideway 160. Referring to FIG. 6, a spring-pressed plunger 230 is arranged to bear against an upper surface 232 on each slide 162, thus to hold the slide yieldingly down against the bottom of its guideway 160. However, as the shank wipers are moved inwardly to wipe the upper materials over the shank portions of a shoe, the slides may be forced to swing upwardly against the resistance of the spring-pressed plungers to the extent determined by rollers 234 carried by the machine frame and arranged to engage the upper surfaces 232 on the slides 162. As each slide completes its inward movement, the roll 234 associated therewith rides up an incline 236 onto a flat surface 238 thereby locking the shank wiper carried by the slide rigidly against upward movement.

The fluid pressure system for actuating the several fluid pressure operated pistons 30, 66, 90, 90 and 204, 204 is diagrammatically illustrated in FIG. 16, while the electrical circuits associated therewith are shown in FIG. 17. Referring to FIG. 16, fluid under pressure, e.g., compressed air, from a source not shown, is supplied to a main supply conduit 300 through a filter 302, pressure regulator valve 304, and lubricating device 306. A branch conduit 308 leads to a solenoid operated spring returned reversing valve 310 adapted, when its solenoid 312 is deenergized, to be moved to the position in which it is shown in FIG. 16 by a spring 314, thus to connect a conduit 316, leading to the lower portion of the cylinder 32 beneath the piston 30 therein, to the branch line 308 and to connect a conduit 318, leading to the upper portion of the cylinder 32, above the piston 30, to exhaust, thereby causing the piston 30 to be held in an elevated postion with the shoe supporting jack moved to its retracted and lowered position. Now, when the solenoid 312 is energized, in response to an initial closing movement of a two-stage foot switch 320 having a foot treadle 322, see FIG. 1, the position of valve 310 is reversed, thereby connecting the cylinder 32 beneath the piston 30 to exhaust, while admitting air under pressure to this cylinder above the piston. The piston 30 is now moved downwardly and as a result of such downward movement of this piston the lever 36, FIG. 1, which, as explained above, corresponds to the foot treadle 100 of the machine shown in the Fausse patent, is moved downwardly and the shoe supporting jack 26 is swung inwardly, to bring the heel end of a shoe thereon into engagement with the heel band 44, and is elevated to bring the heel end of the bottom of the shoe up against the holddown 42, in the manner explained in the mentioned patent.

Also extending from the main supply conduit 300 is a second branch conduit 330 which leads to another solenoid operated spring returned reversing valve 332 having an actuating solenoid 334 and a return spring 336. When the solenoid 334 is deenergized, the valve 332 is held in the position shown in FIG. 16 by spring 336, thus connecting the branch conduit 330 to a conduit 338 which is connected to the conduit 130 along two different paths, i.e., through a check valve 340, and by a conduit 342, sequence valve 344, pressure regulator valve 346, and a double acting check valve 348, while connecting the conduit 132 to exhaust, thereby causing the piston 66 to assume the position shown in FIG. 16 in which the grippers 72, 72, connected to this piston, are elevated to the positions in which they are shown in FIGS. 1–3, 5, 6 and 9. A branch conduit 350 is connected to the conduit 338 at a point located between the valve 332 and a quick dump valve 352 interposed in the conduit 338. The conduit 350 leads to a pressure operated spring returned valve 360 adapted, when held in the position in which it is shown in FIG. 16 by a pressure actuated diaphragm 361 against the action of its return spring 362, to connect the conduit 350 to a conduit 364 and to connect the conduit 134, which leads to the cylinders 84, 84 and which has therein a quick dump valve 366, to exhaust. The conduit 364 leads to the double acting check valve 348 previously mentioned and also to a spring returned manually operable valve 370 having a return spring 372 and an operating plunger 374. When the valve 370 is held in the position shown in FIG. 16 by its return spring 372, the conduit 364 is connected to a conduit 376, which leads to the pressure diaphragm 361 of the valve 360, through a double acting check valve 378.

Upon a full depression of the treadle 322, the switch 320 is moved to its second position and energizes the solenoid 334 of valve 332 through the now closed contacts of a relay 380, a limit switch 382 (first position) and the normally closed contacts of a relay 384, see FIG. 17. Valve 332 is thus shifted to a position in which the conduit 338 and hence conduits 130, 350 and 364 are connected to exhaust through quick dump valve 352, while the conduit 132 is connected to the conduit 330. The piston 64 now descends and carries the grippers 72, 72 downwardly to the positions shown in FIGS. 4, 7 and 8. When the grippers reach their lowermost positions, the limit switch 382, is moved to its second (dotted line) position by means of a rearwardly extending portion of the fulcrum pin 69 on which lever 70 is mounted, FIG. 14, thus energizing the coil of a relay 384 which results in the deenergizing of the solenoid 334, see FIG. 17. Valve 332 is now returned by the spring 336 to the position shown in FIG. 16, whereupon air under pressure from the conduit 330 flows first through the conduit 350 to the valve 360, now held by its return spring 362 in a position to connect the conduit 134 to the conduit 350. The jaws 102, 102 of the grippers 72, 72 are now closed as a result of the downward movements of the pistons 92, 92 in the cylinders 84, 84 and as pressure builds up in the conduits 134, 350 and 338, as the lasting margin of the upper materials is gripped by the grippers, sequence valve 344 eventually opens and admits fluid under pressure to the conduit 342 and thence through pressure regulator valve 346 and the double acting check valve 348 to the lower portion of the cylinder 64. Piston 66 is now forced upwardly and carries with it the grippers 72, 72 thus causing these grippers to exert tensioning pulls on the upper materials, see FIG. 7. As piston 66 rises, switch 382 is returned by a self-contained spring to its first (solid line) position, FIG. 17, but since a normally closed contact of the relay 384 is now opened, solenoid 334 is still deenergized and valve 332 remains in the position shown in FIG. 16.

A third branch conduit 400 leads to the valve 370 which may be shifted by means of its plunger 374, see FIGS. 2–6 and 16, against the resistance of the spring 372, to a position in which the branch conduit 400 is connected to the conduit 376, for a purpose which will appear below. A fourth branch conduit 410 leads to a solenoid operated spring returned valve 412 from which a conduit 414 leads, through a quick dump valve 416 and a sequence valve 418, to a conduit 420, which is connected to the double check valve 378, and through a pressure regulator valve 422 to the conduit 210 which is associated with the shank wiper operating cylinders 200. When the solenoid 424 of the valve 412 is deenergized, a return spring 426 holds this valve in the position in which it is shown in FIG. 16 with flow through conduit 410 blocked and with conduit 414 connected to exhaust. On the other hand, when the solenoid 424 is energized, in a manner about to be explained, the valve 412 will be moved to a position to connect the conduit 410 to the conduit 416 and to disconnect the latter conduit from exhaust. A pressure gage 428 is associated with the conduit 210 to indicate the pressure of the operating fluid therein as determined by the setting of pressure regulator valve 422.

A fifth branch conduit 430 leads, through a solenoid operated spring-returned valve 432 having a solenoid 434 and a return spring 436, to a conduit 438 which is connected to a cylinder 440 in which the clutch tripping piston, which has been mentioned above, is received. When the valve 432 is held in the position shown by its spring 436, conduit 438 is connected to exhaust and flow through conduit 430 is blocked. On the other hand, when the solenoid 434 of the valve 432 is energized, in a manner about to be explained, the valve 432 will be shifted to a position in which conduit 430 is connected to the conduit 438 and the latter conduit is disconnected from exhaust. Piston 40 will now be moved within its cylinder against the action of a return spring 442 to trip the clutch of the heel seat lasting machine and thus initiate an automatic operating cycle of the heel seat lasting instrumentalities.

Referring again to the grippers 72, 72, as they exert their tensioning pulls on the upper material at the opposite sides of the shank portion of the shoe, the pressure of the operating fluid in conduit 342 will build up to an intensity sufficient to close a pressure switch 450 operatively connected to the conduit 342, see FIGS. 16 and 17. Now, if a selective (Manual or Automatic) switch 452 is set for automatic operation of the shank wipers (solid line position) as shown in FIG. 17 of the drawings, the solenoid 424 will be energized as a result of the closing of the pressure switch 450 and the previous closing of a normally open contact of the relay 384. Valve 412 will now be shifted to a position to admit operating fluid from the conduit 410 to the conduit 414 and thence, through pressure regulating valve 422, to the conduit 210 and to cylinders 200. The shank wiper carrying slides 162, 162 are accordingly moved inwardly, by the action of the pistons 204, 204 against the resistance of return springs 206, 206, carrying with them the shank wipers 168, 170 and 174, see FIGS. 9 and 11. As these shank wipers come into engagement with the upper materials then held under tension by the grippers 72, 72, FIG. 8, the pressure of the operating fluid will build up in the conduit 414 to an intensity sufficient to open the sequence valve 418, thereby admitting fluid under pressure to the conduit 420 and thence, through the double check valve 378, to conduit 376 and to the diaphragm 361. As the result of the pressure of the fluid acting on this diaphragm, the valve 360 will be returned to the position shown in FIG. 16, thereby connecting the conduit 134 to exhaust and causing the gripper jaws 102, 102 to open and release the upper materials. The pressure of the operating fluid in conduits 338 and 130, also in conduit 364, will now act on the piston 66 to elevate the grippers to the positions shown in FIGS. 5 and 9.

The shank wipers continue their inward movements until they reach the positions shown in FIGS. 9 and 11 in which the lasting margin of the upper materials at the opposite sides of the shank portion of the shoe will have been wiped inwardly over the shoe bottom. Inward movements of each shank wiper carrying slide 162 is limited to the position shown in FIG. 11 and just as each slide reaches its limit of inward movement, the lever 214 associated therewith, see FIGS. 2–6, strikes and closes a microswitch. These two microswitches are shown diagrammatically in FIG. 17 and are identified in that figure by reference characters 460, 462 but are not visible in FIGS. 2–6 inasmuch as they are mounted on rearward portions of the plates 202, 202 in positions to be operated by rearwardly extending portions of the levers 214, 214. Thus, if a manual clutch release switch 464, FIG. 17, is in its normally closed position when the shank wiping operation has been completed, the solenoid 434 of the valve 432 will be energized by the closing of the two switches 460, 462, thus shifting the valve 432 to a position in which operating fluid is admitted to the conduit 438 and thence to the cylinder 440 and piston 40. The clutch of the heel seat lasting machine will now be tripped to initiate an automatic operating cycle of the heel seat lasting instrumentalities which are effected by one complete revolution of the main shaft 22 by the motor 24, previously set into operation by the closing of a starting switch 466, FIG. 17, which energizes a motor relay 468.

Secured to the main shaft 22 of the heel seat lasting machine is a cam 470 having a rise which is adapted to hold a switch 474 in the first position (solid lines) in which it is shown in FIG. 17 when the shaft 22 is at rest. The aforementioned cam is shown diagrammatically as a part of FIG. 16 but is actually located in such a position as to be hidden from view in FIG. 1 of the drawings. Immediately after the engagement of the clutch to connect the shaft 22 with the motor 24, thus to start a single revolution of this shaft, the switch 474 is moved by a self-contained spring to a second position (dotted lines) in which the coil of a relay 480 is energized and the normally open contacts associated with this relay are closed. At the completion of a single revolution of the shaft 22, during which the heel seat lasting instrumentalities will be operated in a manner explained in the above-mentioned patents and the heel seat wipers 50, 50 operated to wipe the lasting margin of the upper materials inwardly over the heel seat of the shoe as shown in FIG. 12 of the drawings, the switch 474 is returned to its first position, as shown in FIG. 17. Now, a relay 482 is energized, thus closing a normally open contact associated therewith and opening three normally closed contacts also associated with this relay. As a result of the opening of the last-mentioned three contacts, and with treadle 322 released, all of the electrical circuits are momentarily opened and then returned to the condition shown in FIG. 17.

The shoe supporting jack 26 is thus released for gravity return to its original loading position, see FIG. 1, being assisted in such return movement by a spring-pressed plunger forming a part of the heel seat lasting machine, see plunger 116 of the machine disclosed in the above-mentioned Fausse patent, while the shank wiping members are moved outwardly by the action of the return springs 206, 206. If treadle 322 has not been released, the jack will still be released as the relay 380 is deenergized by the opening of one of the normally closed contacts of the relay 482, but the shank wipers will remain in their innermost positions until this treadle is released. When the electrical circuits are restored to their original conditions, as shown in FIG. 17, the solenoids 312, 334, 424 and 434 will all be deenergized and valves 310, 332, 412 and 432 are returned to the positions shown in FIG. 16.

Referring to FIG. 6, the manually operable switches 452 and 464, referred to above, are conveniently located in a switch box 500 which is mounted on the left-hand side of the front of the machine frame 20. Also, the manually operable valve 370 is mounted on one of the forwardly projecting portions of the machine frame in an easily accessible location directly above the switch blocks. In addition to the previously mentioned manually operable switches, three other manually operable switches are also located in the switch box 500. These include a release switch 502, a manual shank wiping switch 504, and a shank gripper repeat switch 506. In the ordinary use of the machine, the switch 452 is moved to the position (automatic) shown in FIG. 17, thus setting the electrical circuits for automatic operation of the shank wipers upon the closing of the pressure switch 450 in response to the building up of pressure of the operating fluid in the conduit 342 as the grippers 72, 72 apply their tensioning pulls on the upper materials at the opposite sides of the shank portion of the shoe. If desired, however, this switch may be moved to the dotted line (manual) position shown in FIG. 17. When this is done, the grippers will be operated to descend, close on the upper materials, and then move upwardly to apply their tensioning pulls in response to the depression of the switch treadle 322 to its second position, in the manner described above. Now, by closing the manual shank gripper repeat switch 506, the grippers may be caused to release the upper, move downwardly, again close on the upper, and then move upwardly to apply their tensioning pulls, i.e., to repeat their upper gripping and tensioning actions. If the manual shank wiping switch 504 is next closed, the shank wipers will be operated and at the conclusion of their wiping actions, the clutch of the heel seat lasting machine will be engaged and an automatic cycle of operation of the heel seat lasting instrumentalities effected in the usual manner. After the treadle 322 has been fully depressed and the machine brought to a stop with the upper under tension but before the manual shank wiping switch 504 has been closed, the grippers may be opened to release the upper materials by pushing in the manually operable plunger 374, FIG. 6, and the jack returned to its original position by opening the manually operable release switch 502.

While the operation of the herein illustrated machine should be clear from the preceding description of the various operating elements, it will now be outlined with reference to the lasting of the shank portions and heel seat of a shoe in the ordinary use of the machine in which the switches 452 and 464 are in the closed positions shown in FIG. 17. The shoe S to be lasted, the toe and forepart of which would preferably have already been lasted in another machine, is placed on the shoe supporting jack 26 and, in response to depression of the treadle 322 of the switch 320 to its first position, FIG. 17, the jack will be swung inwardly to bring the heel end of the shoe into contact with the heel band 44 and elevated to press the heel end of the shoe bottom against the holddown 42. Should the operator not be satisfied with the position of the shoe he can lift his foot from the treadle 322, thereby causing the jack to return to its original loading position and then repeat the operation of the jack by again depressing the treadle 322 to its first position. Now, in response to a depression of this switch treadle to its second position, the grippers 72, 72 will be caused to descend, close on the lasting margin of the upper U at the opposite sides of the shank portions of the shoe, and then move upwardly to exert a tensioning pull thereon, see FIGS. 4, 7 and 10. Now, as pressure builds up in the conduit 342 as a result of the pull being applied by the grippers, the pressure switch 450 is closed, whereupon the slides 162, 162 will be moved inwardly by the fluid pressure actuators 200, 200, FIG. 16, to cause the shank wipers which are carried by these slides to commence to wipe the lasting margin of the upper materials inwardly over the shank portions at the opposite sides of the shoe. As the upper materials are now engaged by the shank wipers, as shown diagrammatically in FIG. 8, pressure builds up in the conduit 414 and sequence valve 418 opens, thereby causing the grippers to open and release the upper, whereupon the shank wipers quickly complete their wiping movements, finally arriving at the positions shown in FIGS. 5, 9 and 11, in which positions the switches 460 and 462 are closed.

The closing of the two last-mentioned switches causes the clutch of the heel seat lasting machine to be engaged and thus initiates an automatic operating cycle of the heel seat lasting instrumentalities. During this automatic operating cycle, the jack 26 is actuated in the usual manner, as explained in the patents mentioned above, to force the heel end of the shoe rearwardly into the heel band and to clamp the shoe against the holddown. Preferably, the mechanism for actuating the holddown 42, which is essentially the same as that disclosed in the Hoyt patent, mentioned above, is so adjusted that the holddown remains substantially in the position shown in FIG. 13 during both the first and second operations of the heel seat wipers, thereby maintaining the bottom of the shoe in the same heightwise position and with the shank wipers pressing firmly against the lasting margin of the upper previously wiped inwardly over the shank portions of the shoe. However, in common with the machine of the previously mentioned patent, after the heel seat wipers have completed their two wiping actions and arrived at the positions shown in FIG. 12, and just before the fastener inserting mechanism is actuated, the holddown is elevated slightly and the jack is operated to raise the shoe and to press it more firmly against the shank and heel seat wipers. After the fastenings have been driven and the operating cycle of the heel seat lasting machine completed, the shaft 22 returns to its original position and the various electrical circuits are opened, thereby releasing the jack for return to its loading position with the lasted shoe thereon, see FIG. 6, and the shank wipers to be retracted by return springs 206, 206.

Referring to FIG. 12, it will be noted that the fixed wiper portions 168, 168 of the shank wipers extend heelwardly of the shoe being lasted a substantial distance beyond the toeward limit of action of the heel seat wipers 50, 50 and also that these portions are of such a width as to provide a space for the toeward portions of the heel seat wipers to complete their advancing and closing movements. Thus an overlapping action of these portions of the shank wipers and heel seat wipers is provided which avoids the formation of any ridge or similar line of demarkation on the overlasted margin of the upper in the locations between the heel and shank portions of the shoe. As is explained above, when the shank wipers are wiping the lasting margin of the upper material inwardly, they may yield upwardly and thus "climb" over the marginal edges of the shank portions of the shoe. However, as these wipers complete their inward movements, they become fixed against heightwise movement by the rollers 234 and are thus held rigidly to apply pressure against the overlasted margin of the upper materials when the holddown 42 is elevated and the jack 26 operated to force the shoe upwardly against the shank wipers and heel seat wipers.

The flexible portions 170, 170 of the shank wipers conform to the contours of the shank portions of the shoe being lasted as the articulated links 172, 172 flex against the yieldable resistance of springs 180, 192, 192, and the inclination of these flexible shank portions, relatively to a horizontal plane, may be varied by suitable heightwise and lengthwise adjustments of the blocks 174 as is permitted by loosening of the clamp screws 169 and 178. Also, the "break" point between the inclined part of the flexible wiper portion 170 and the relative flat portion thereof adjacent to the fixed wiper 174, may be varied by manipulation of the adjusting nut 190. It will be understood that due to the inherent flexibility of the shank wiper portion 170, these shank wipers are capable of automatically adjusting themselves to the contour of the shank portions of shoes of a fairly wide range of sizes. Accordingly, the aforementioned adjustments need be made only infrequently and when large differences in size and/or heel height are encountered. Having made the necessary adjustments, all the operator has to do is to load the shoes onto the jack, operate the treadle 322 of the foot switch 320 in the manner explained above, whereupon the jack is moved to its operative position, the shank lasting instrumentalities, including the shank grippers and the shank wipers are actuated to last the upper materials at the opposite sides of the shank portion of the shoe, and finally the heel seat lasting instrumentalities are actuated and caused to go through their automatic operating cycle, thus to last the heel seat portion of the shoe without any further attention on the part of the operator. However, if desired for any reason, the machine may be made to come to a stop either with the shank grippers tensioning the upper, or after the shank wipers have completed their inward actions. In either case, the operator can then close an appropriate switch and thus effect the completion of the heel and shank lasting operations.

Having described the invention, what is claimed as new and desired to secure by United States Letters Patent is:

1. In a machine for lasting the heel seat and adjacent shank portions of a shoe having a support for a shoe including an upper and an insole assembled on a last, a heel band for embracing the heel end of a shoe on the support operable to press and to shape the upper materials to the heel end of the last, heel end wipers for wiping the lasting margin of the upper materials inwardly over and for pressing them against the heel end of an insole on the last in an automatic cycle of operations of the machine, power operated means for actuating said heel band and said wipers, and a control means for initiating an automatic operating cycle of the shoe support, heel band and wipers by the power operated means, shank last instrumentalities associated with the machine for tensioning the upper materials in two locations on the opposite sides of the shank portion of the shoe and for wiping the lasting margin of the tensioned upper materials inwardly over and for pressing said lasting margin against the bottom of the insole in the opposite shank portions of the shoe, power operated means for actuating said shank lasting instrumentalities, and means responsive to the completion of the actuation of said shank lasting instrumentalities for actuating said control means to initiate an automatic operating cycle of the heel band and heel seat wipers.

2. In a machine for lasting the heel seat and adjacent shank portions of a shoe having a support for a shoe including an upper and an insole assembled on a last, a heel band for embracing the heel end of a shoe on the support and operable to press and to shape the upper materials to the heel end of the last, heel end wipers for wiping the lasting margin of the upper materials inwardly over and for pressing them against the heel end of an insole on the last, means for inserting fastenings through said wipers and into said lasting margin in an automatic cycle of operations of the machine, power operated means for actuating the heel band, wipers and fastening inserting mechanism in predetermined sequence, and a control means for initiating an automatic operating cycle of the heel band, wipers and fastening inserting mechanism by the power operated means, shank lasting instrumentalities associated with the machine for tensioning the upper materials in two locations on the opposite sides of the shank portion of the shoe and for wiping the lasting margin of the tensioned upper materials inwardly over and for pressing said lasting margin against the bottom of the insole in the opposite shank portions of the shoe, power operated means for actuating said shank lasting instrumentalities, and means responsive to the completion of the actuation of said shank lasting instrumentalities for actuating said control means to initiate an automatic operating cycle of the heel band, heel seat wipers and fastening inserting mechanism.

3. In a machine for lasting the heel seat and adjacent shank portions of a shoe having a support for a shoe including an upper and an insole assembled on a last, a heel band for embracing the heel end of a shoe on the support and operable to press and to shape the upper materials to the heel end of the last, heel end wipers for wiping the lasting margin of the upper materials inwardly over and for pressing them against the heel end of an insole on the last in an automatic cycle of operation of the machine, power operated means for actuating the heel band and the wipers, and a control means for initiating an automatic operating cycle of the heel band and wipers by the power operated means, shank lasting instrumentalities associated with the machine comprising a pair of grippers for tensioning the upper materials in two locations on the opposite sides of the shank portion of the shoe and a pair of wipers for wiping the lasting margin of the tensioned upper materials inwardly over and for pressing said lasting margin against the bottom of the insole in the opposite shank portions of the shoe, power operated means for actuating said shank lasting instrumentalities, and means responsive to the completion of the actuation of said shank lasting instrumentalities for actuating said control means to initiate an automatic operating cycle of the heel band and heel seat wipers.

4. In a machine for lasting the heel seat and adjacent shank portions of a shoe having a support for a shoe including an upper and an insole assembled on a last, a heel band for embracing the heel end of a shoe on the support and operable to press and to shape the upper materials to the heel end of the last, heel end wipers for wiping the lasting margin of the upper materials inwardly over and for pressing them against the heel end of an insole on the last, mechanism for inserting fastenings through said wipers and into the lasting margin in an automatic cycle of operation of the machine, power operated means for actuating the heel band, wipers, and fastening inserting mechanism in a predetermined sequence, and a control means for initiating an automatic operating cycle of the heel band, wipers and fastening inserting mechanism by the power operated means, shank lasting instrumentalities associated with the machine and comprising a pair of grippers for tensioning the upper materials in two locations on the opposite sides of the shank portion of the shoe and a pair of wipers for wiping the lasting margin of the tensioned upper materials inwardly over and for pressing said lasting margin against the bottom of the insole in the opposite shank portions of the shoe, power operated means for actuating said shank lasting instrumentalities, and means responsive to the completion of the actuation of said shank lasting instrumentalities for actuating said control means to initiate an automatic operating cycle of the heel band, heel seat wipers, and fastening inserting mechanism.

5. In a machine for lasting the heel seat and adjacent shank portions of a shoe and having a support for a shoe including an upper and an insole assembled on a last, a heel band for embracing the heel end of a shoe on the support and operable to press and to shape the upper materials to the heel end of the last, heel end wipers for wiping the lasting margin of the upper materials inwardly over and for pressing them against the heel end of an insole on the last in an automatic cycle of operation of the machine, power operated means for actuating the heel band and wipers, and a clutch for initiating an automatic operating cycle of the heel band and wipers by the power operated means, shank lasting instrumentalities associated with the machine for tensioning the upper materials in two locations on the opposite sides of the shank portion of the shoe and for wiping the lasting margin of the tensioned upper materials inwardly over and for pressing said lasting margin against the bottom of the insole in the opposite shank portions of the shoe, fluid pressure operated means for actuating said shank lasting instrumentalities, and fluid pressure operated means responsive to the completion of the actuation of said shank lasting instrumentalities for tripping said clutch to initiate an automatic operating cycle of the heel band and heel seat wipers.

6. In a machine for lasting the heel seat and adjacent shank portion of a shoe having a support for a shoe including an upper and an insole assembled on a last, a heel band for embracing the heel end of a shoe on the support and operable to press and to shape the upper materials to the heel end of the last, heel end wipers for wiping the lasting margin of the upper materials inwardly over and for pressing them against the heel end of an insole on the last, mechanism for inserting fastenings through said wipers and into the lasting margin in an automatic cycle of operation of the machine, power operated means for actuating the heel band, wipers, and fastening inserting mechanism in a predetermined sequence, and a clutch for initiating an automatic operating cycle of the heel band, wipers and fastening inserting mechanism by the power operated means, shank lasting instrumentalities associated with the machine for tensioning the upper materials in two locations on the opposite sides of the shank portion of the shoe and for wiping the lasting margin of the tensioned upper materials inwardly over and for pressing said lasting margin against the bottom of the insole in the opposite shank portions of the shoe, fluid pressure operated means for actuating said shank lasting instrumentalities, and fluid pressure operated means responsive to the completion of the actuation of said shank lasting instrumentalities for tripping said clutch to initiate an automatic operating cycle of the heel band, heel seat wipers and fastening inserting mechanism.

7. In a machine for lasting the heel seat and adjacent shank portions of a shoe having a support for a shoe including an upper and an insole assembled on a last, a heel band for embracing the heel end of a shoe on the support and operable to press and to shape the upper materials to the heel end of the last, heel end wipers for wiping the lasting margin of the upper materials inwardly over and for pressing them against the heel end of an insole on the last in an automatic cycle of operation of the machine, power operated means for actuating the heel band and the wipers, and a clutch for initiating an automatic operating cycle of the heel band and wipers by the power operated means, shank lasting instrumentalities associated with the machine and comprising a pair of grippers for tensioning the upper materials in locations on the opposite sides of the shank portion of the shoe and a pair of wipers for wiping the lasting margin of the tensioned upper materials inwardly over and for pressing said lasting margin against the bottom of the insole in the opposite shank portions of the shoe, fluid pressure operated means for actuating said shank lasting instrumentalities, and fluid pressure operated means responsive to the completion of the actuation of said shank lasting instrumentalities for tripping said clutch to initiate an automatic operating cycle of the heel band and heel seat wipers.

8. In a machine for lasting the heel seat and adjacent shank portions of a shoe having a support for a shoe including an upper and an insole assembled on a last, a heel band for embracing the heel end of a shoe on the support and operable to press and to shape the upper materials to the heel end of the last, heel end wipers for wiping the lasting margin of the upper materials inwardly over and for pressing them against the heel end of an insole on the last, mechanism for inserting fastenings through said wipers and into the lasting margin in an automatic cycle of operation of the machine, power operated means for actuating the heel band, wipers, and fastening inserting mechanism in a predetermined sequence, and a clutch for initiating an automatic operating cycle of the heel band, wipers and fastening inserting mechanism by the power operated means, shank lasting instrumentalities associated with the machine and comprising a pair of grippers for tensioning the upper materials in two locations on the opposite sides of the shank portion of the shoe and a pair of wipers for wiping the lasting margin of the tensioned upper materials inwardly over and for pressing said lasting margin against the bottom of the insole in the opposite shank portions of the shoe, fluid pressure operated means for actuating said shank lasting instrumentalities, and fluid pressure operated means responsive to the completion of the actuation of said shank lasting instrumentalities for tripping said clutch to initiate an automatic operating cycle of the heel band, heel seat wipers and fastening inserting mechanism.

9. In a machine for lasting the heel seat and adjacent shank portions of a shoe having a support for a shoe, including an upper and an insole assembled on a last, mounted for movement from an inoperative position to an operative position, power operated means for moving the support to said operative position, a heel band for embracing the heel end of a shoe on the support when the support is in operative position and operable to press and to shape the upper materials to the heel end of the last, heel end wipers for wiping the lasting margin of the upper materials inwardly over and for pressing them against the heel end of an insole on the last, power operated means for actuating said heel band and said wipers in an automatic cycle of operations, and a control means for initiating operation of said heel band and wipers by said power operated means, shank lasting instrumentalities for tensioning the upper and for wiping the lasting margin of the tensioned upper inwardly over and for pressing it against the insole at the opposite sides of the shank portion of the shoe, power operated means for actuating said shank lasting instrumentalities, means responsive to the completion of the operation of said shank lasting instrumentalities for actuating the control means to initiate an automatic cycle of operations of the heel band and heel wipers, and means including a member movable to two positions, successively, by the operator and adapted when the member is moved to its first position to cause the first-mentioned power operated means to move the support to operative position and when it it moved to its second position to cause the last-mentioned power operated means to actuate said shank lasting instrumentalities.

10. In a machine for lasting the heel seat and adjacent shank portions of a shoe having a support for a shoe, including an upper and an insole assembled on a last, mounted for movement from an inoperative position to an operative position, power operated means for moving the support to said operative position, a heel band for embracing the heel end of a shoe on the support when said support is in operative position and operable to press and to shape the upper materials to the heel end of the last, heel end wipers for wiping the lasting margin of the upper materials inwardly over and for pressing them against the heel end of an insole on the last, power operated means for actuating said heel band and said wipers in an automatic cycle of operations, and a clutch for initiating operation of the heel band and wipers by said last-mentioned power operated means, shank lasting instrumentalities for tensioning the upper and for wiping the lasting margin of the tensioned upper inwardly over and for pressing it against the insole at the opposite sides of the shank portion of the shoe, power operated means for actuating said shank lasting instrumentalities, means responsive to the completion of the operation of said shank lasting instrumentalities for tripping the clutch to initiate an automatic cycle of operations of the heel band and heel wipers, and control means including a member movable by the foot of an operator to two positions, successively, and adapted, when the member is moved to its first position, to cause the first-mentioned power operated means to move the support to its operative position, and when it is moved to its second position, to cause the third-mentioned power operated means to actuate said shank lasting instrumentalities.

11. In a machine for lasting the heel seat and adjacent shank portions of a shoe having a support for a shoe, including an upper and an insole assembled on a last, mounted for movement from an inoperative position to an operative position, fluid pressure operated means for moving the support to said operative position, a heel band for embracing the heel end of a shoe on the support when said support is in operative position and operable to press and to shape the upper materials to the heel end of the last, heel end wipers for wiping the lasting margin of the upper materials inwardly over and for pressing them against the heel end of an insole on the last, power operated means for actuating said heel band and said wipers in an automatic cycle of operations, and a control means for initiating operation of the heel band and wipers by said power operated means, shank lasting instrumentalities for tensioning the upper and for wiping the lasting margin of the tensioned upper inwardly over and for pressing it against the insole at the opposite sides of the shank portion of the shoe, fluid pressure operated means for actuating said shank lasting instrumentalities, fluid pressure operated means responsive to the completion of the operation of said shank lasting instrumentalities for actuating the control means to initiate an automatic cycle of operations of the heel band and heel wipers, and means including a member movable by the operator to two positions successively, and adapted when the member is moved to its first position, to cause the first-mentioned fluid pressure operated means to move the support to its operative position and when it is moved to its second position, to cause the second-mentioned fluid pressure operated means to actuate said shank lasting instrumentalities.

12. In a machine for lasting the heel seat and adjacent shank portions of a shoe having a support for a shoe, including an upper and an insole assembled on a last, mounted for movement from an inoperative position to an operative position, power operated means for moving the support to said operative position, a heel band for embracing the heel end of a shoe on the support when said support is in operative position and operable to press and to shape the upper materials to the heel end of the last, heel end wipers for wiping the lasting margin of the upper materials inwardly over and for pressing them against the heel end of an insole on the last, power operated means for actuating said heel band and said wipers in an automatic cycle of operations, and a control means for initiating operation of the heel band and wipers by said last-named power operated means, shank lasting instrumentalities for tensioning the upper and for wiping the lasting margin of the tensioned upper inwardly over and for pressing it against the insole at the opposite sides of the shank portion of the shoe, power operated means for actuating said shank lasting instrumentalities, means responsive to the completion of the operation of said shank lasting instrumentalities for actuating the control means to initiate an automatic cycle of operations of the heel band and heel wipers, and an electrical control means including a member movable by the operator to two positions, successively, and adapted when the member is moved to its first position, to cause the first-mentioned power operated means to move the support to its operative position, and when it is moved to its second position to cause the third-mentioned power-operated means to actuate said shank lasting instrumentalities.

13. In a machine for lasting the heel seat and adjacent shank portions of a shoe having a support for a shoe, including an upper and an insole assembled on a last, mounted for movement from an inoperative position to an operative position, and power operated means for moving the support to said operative position, a heel band for embracing the heel end of a shoe on the support when the support is in operative position and operable to press and to shape the upper materials to the heel end of the last, heel end wipers for wiping the lasting margin of the upper materials inwardly over and for pressing them against the heel end of an insole on the last, power operated means for actuating said heel band and said wipers in an automatic cycle of operations, and a clutch for initiating operation of the heel band and wipers by said last-named power operated means, shank lasting instrumentalities for tensioning the upper and for wiping the lasting margin of the tensioned upper inwardly over and for pressing it against the insole at the opposite sides of the shank portion of the shoe, power operated means for actuating said shank lasting instrumentalities, means responsive to the completion of the operation of said shank lasting instrumentalities for tripping the clutch to initiate an automatic cycle of operations of the heel band and heel wipers, and an electrical control means including a member movable by the foot of the operator to two positions, successively, and adapted when the member is moved to its first position to cause the first-mentioned power operated means to move the support to its operative position, and when it is moved to its second position, to cause the third-mentioned power operated means to actuate said shank lasting instrumentalities.

14. In a machine for lasting the heel seat and adjacent shank portions of a shoe having a support for a shoe, including an upper and an insole assembled on a last, mounted for movement from an inoperative position to an operative position, fluid pressure operated means for moving the support to said operative position, a heel band for embracing the heel end of a shoe on the support when said support is in operative position and operable to press and to shape the upper materials to the heel end of the last, heel end wipers for wiping the lasting margin of the upper materials inwardly over and for pressing them against the heel end of an insole on the last, power operated means for actuating said heel band and said wipers in an automatic cycle of operations, and a control means for initiating operation of the heel band and wipers by said power operated means, shank lasting instrumentalities for tensioning the upper and for wiping the lasting margin of the tensioned upper inwardly over and for pressing it against the insole at the opposite sides of the shank portion of the shoe, fluid pressure operated means for actuating said shank lasting instrumentalities, fluid pressure operated means responsive to the completion of the operation of said shank lasting instrumentalities for actuating the control means to initiate an automatic cycle of operations of the heel band and heel wipers, an electrical control means including a member movable by the operator to two positions, successively, and adapted when the member is moved to its first position, to cause the first-mentioned fluid pressure operated means to move the support to its operative position, and when it is moved to its second position, to cause the second-mentioned fluid pressure operated means to actuate said shank lasting instrumentalities.

15. In a machine for lasting the heel seat and adjacent shank portions of a shoe having a support for a shoe, including an upper and an insole assembled on a last, mounted for movement from an inoperative position to an operative position, fluid pressure operated means for moving the support to said operative position, a heel band for embracing the heel end of a shoe on the support when said support is in operative position and operable to press and to shape the upper materials to the heel end of the last, heel end wipers for wiping the lasting margin of the upper materials inwardly over and for pressing them against the heel end of an insole on the last, power operated means for actuating said heel band and said wipers in an automatic cycle of operations, and a clutch for initiating operation of the heel band and wipers by said power operated means, shank lasting instrumentalities for tensioning the upper and for wiping the lasting margin of the tensioned upper inwardly over and for pressing it against the insole at the opposite sides of the shank portion of the shoe, fluid pressure operated means for actuating said shank lasting instrumentalities, fluid pressure operated means responsive to the completion of the operation of said shank lasting instrumentalities for tripping the clutch to initiate an automatic cycle of operations of the heel band and heel wipers, and an electrical control means including a member movable by the foot of the operator to two positions, successively, and adapted when the member is moved to its first position to cause the first-mentioned fluid pressure operated means to move the support to its operative position and when it is moved to its second position to cause the second-mentioned fluid pressure operated means to actuate said shank lasting instrumentalities.

16. In a machine for lasting the heel seat and adjacent shank portions of a shoe having a support for a shoe including an upper and an insole assembied on a last, a heel band for embracing the heel end of a shoe on the support, heel end wipers mounted for advancing movements lengthwise of a shoe on the support and for closing movements to wipe the lasting margin of the upper materials inwardly over and for pressing them against the heel end of the insole of the shoe in an automatic cycle of operations of the machine, power operated means for actuating the heel band and wipers, and a control means for initiating an automatic operating cycle of the heel band and wipers by the power operated means, shank lasting instrumentalities comprising a pair of shank wipers for wiping the lasting margin of the upper materials inwardly over and for pressing the lasting margin against the bottom of the insole at the opposite sides of the shank portion of the shoe, said shank wipers each including a portion extending heelwardly of the shoe being lasted a substantial distance beyond the toeward limit of action of said heel seat wipers, and power operated means for actuating said shank wipers prior to the actuation of said control means.

17. In a machine for lasting the heel seat and adjacent shank portions of a shoe having a support for a shoe including an upper and an insole assembled on a last, a heel band for embracing the heel end of a shoe on the support, heel end wipers mounted for advancing movements lengthwise of a shoe on the support and for closing movements to wipe the lasting margin of the upper materials inwardly over and for pressing them against the heel end of the insole of the shoe in an automatic cycle of operations of the machine, power operated means for actuating the heel band and wipers, and a control means for initiating an automatic operating cycle of the heel band and wipers by the power operated means, shank lasting instrumentalities comprising a pair of shank wipers for wiping the lasting margin of the upper materials inwardly over and for pressing said lasting margin against the bottom of the insole at the opposite sides of the shank portion of the shoe, said shank wipers each including a flexible portion shaped to correspond to the longitudinal curvature of the shank portion of the shoe and a relatively flat portion extending heelwardly of the shoe being lasted a substantial distance beyond the toeward limit of action of said heel seat wipers, and power operated means for actuating said shank wipers prior to the actuation of said control means.

18. In a machine for lasting the heel seat and adjacent shank portions of a shoe having a support for a shoe including an upper and an insole assembled on a last, a heel band for embracing the heel end of a shoe on the support, heel end wipers mounted for advancing movements lengthwise of a shoe on the support and for closing movements to wipe the lasting margin of the upper materials inwardly over and for pressing them against the heel end of the insole of the shoe in an automatic cycle of operations of the machine, power operated means for actuating the heel band and wipers, and a clutch for initiating an automatic operating cycle of the heel band and wipers by the power operated means, shank lasting instrumentalities comprising a pair of shank wipers for wiping the lasting margin of the upper materials inwardly over and for pressing said lasting margin against the bottom of the insole at the opposite sides of the shank portion of the shoe, said shank wipers each including a portion extending heelwardly of the shoe being lasted a substantial distance beyond the toeward limit of action of said heel seat wipers and of a width to provide space for the toeward portion of the heel seat wiper on that side of the shoe to complete its advancing and closing movement, and power operated means for actuating said shank wipers prior to the tripping of said clutch.

19. In a machine for lasting the heel seat and adjacent shank portions of a shoe having a support for a shoe including an upper and an insole assembled on a last, a heel band for embracing the heel end of a shoe on the support, heel end wipers mounted for advancing movements lengthwise of a shoe on the support and for closing movements to wipe the lasting margin of the upper materials inwardly over and for pressing them against the heel end of the insole of the shoe in an automatic cycle of operations of the machine, power operated means for actuating the heel band and wipers, and a clutch for initiating an automatic operating cycle of the heel band and wipers by the power operated means, shank lasting instrumentalities comprising a pair of shank wipers for wiping the lasting margin of the upper materials inwardly over and for pressing said lasting margin against the bottom of the insole at the opposite sides of the shank portion of the shoe, said shank wipers each including a flexible portion shaped to correspond to the longitudinal curvature of the shank portion of the shoe and a relatively flat portion extending heelwardly of the shoe being lasted a substantial distance beyond the toeward limit of action of said heel seat wipers and of a width to provide space for the toeward portion of the heel seat wiper on that side of the shoe to complete its advancing and closing movement, and power operated means for actuating said shank wipers prior to the tripping of said clutch.

20. In a machine for lasting the heel seat and adjacent shank portions of a shoe having a support for a shoe including an upper and an insole assembled on a last, a heel band for embracing the heel end of a shoe on the support, heel end wipers mounted for advancing movements lengthwise of a shoe on the support and for closing movements to wipe the lasting margin of the upper materials inwardly over and for pressing them against the bottom of the heel end of the insole of the shoe in an automatic cycle of operations of the machine, power operated means for actuating the heel band and heel end wipers, and a clutch for initiating an automatic operating cycle of the heel band and heel end wipers by the power operated means, shank lasting instrumentalities including a pair of shank wipers for wiping the lasting margin of the upper materials inwardly over and for pressing said lasting margin against the bottom of the insole at the opposite sides of the shank portion of the shoe, said shank wipers each including a portion extending heelwardly of the shoe being lasted a substantial distance beyond the toeward limit of action of said heel end wipers, power operated means for actuating said shank wipers, and means responsive to the completion of the actuation of said shank lasting instrumentalities for tripping the clutch to initiate an automatic operating cycle of the heel band and heel end wipers.

21. In a machine for lasting the heel seat and adjacent shank portions of a shoe having a support for a shoe including an upper and an insole assembled on a last, a heel band for embracing the heel end of a shoe on the support, heel end wipers mounted for advancing movements lengthwise of a shoe on the support and for closing movements to wipe the lasting margin of the upper materials inwardly over and for pressing them against the bottom of the heel end of the insole of the shoe in an automatic cycle of operations of the machine, power operated means for actuating the heel band and heel end wipers, and a clutch for initiating an automatic operating cycle of the heel band and heel end wipers by the power operated means, shank lasting instrumentalities including a pair of shank wipers for wiping the lasting margin of the upper materials inwardly over and for pressing said lasting margin against the bottom of the insole at the opposite sides of the shank portion of the shoe, said shank wipers each including a flexible portion shaped to correspond to the longitudinal curvature of the shank portion of the shoe and a relatively flat portion extending heelwardly of the shoe being lasted a substantial distance beyond the toeward limit of action of said heel end wipers, power operated means for actuating said shank wipers, and means responsive to the completion of the actuation of said shank lasting instrumentalities for tripping the clutch to initiate an automatic operating cycle of the heel band and heel end wipers.

22. In a machine for lasting the heel seat and adjacent shank portions of a shoe having a support for a shoe including an upper and an insole assembled on a last, a heel band for embracing the heel end of a shoe on the support, heel end wipers mounted for advancing movements lengthwise of a shoe on the support and for closing movements to wipe the lasting margin of the upper materials inwardly over and for pressing them against the bottom of the heel end of the insole of the shoe in an automatic cycle of operations of the machine, power operated means for actuating the heel band and heel end wipers, and a clutch for initiating an automatic operating cycle of the heel band and heel end wipers by the power operated means, shank lasting instrumentalities including a pair of shank wipers for wiping the lasting margin of the upper materials inwardly over and for pressing said lasting margin against the bottom of the insole at the opposite sides of the shank portion of the shoe, said shank wipers each including a portion extending heelwardly of the shoe being lasted a substantial distance beyond the toeward limit of action of said heel end wipers and of a width to provide a space for the toeward portion of the heel end wiper and that side of the shoe to complete its advancing and closing movement, power operated means for actuating said shank wipers, and means responsive to the completion of the actuation of said shank lasting instrumentalities for tripping the clutch to initiate an automatic operating cycle of the heel band and heel end wipers.

23. In a machine for lasting the heel seat and adjacent shank portions of a shoe having a support for a shoe including an upper and an insole assembled on a last, a heel band for embracing the heel end of a shoe on the support, heel end wipers mounted for advancing movements lengthwise of a shoe on the support and for closing movements to wipe the lasting margin of the upper materials inwardly over and for pressing them against the bottom of the heel end of the insole of the shoe in an automatic cycle of operations of the machine, power operated means for actuating the heel band and heel end wipers, and a clutch for initiating an automatic operating cycle of the heel band and heel end wipers by the power operated means, shank lasting instrumentalities including a pair of shank wipers for wiping the lasting margin of the upper materials inwardly over and for pressing said lasting margin against the bottom of the insole at the opposite sides of the shank portion of the shoe, said shank wipers each including a flexible portion shaped to correspond to the longitudinal curvature of the shank portion of the shoe and a relatively flat portion extending heelwardly of the shoe being lasted a substantial distance beyond the toeward limit of action of said heel end wipers and of a width to provide space for the toeward portion of the heel end wiper on that side of the shoe to complete its advancing and closing movements, power operated means for actuating said shank wipers, and means responsive to the completion of the actuation of said shank lasting instrumentalities for tripping the clutch to initiate an automatic operating cycle of the heel band and heel end wipers.

24. In a machine for lasting the opposite shank portions of a shoe having a support for a shoe including an upper and insole assembled on a last, a pair of shank wipers, said support being mounted for movement in a direction perpendicular to said wipers to press the shank portion of the shoe against said wipers, means for thus moving the support, a slide for each of said shank wipers, means for supporting and guiding said slides for movements to cause the wipers to wipe the lasting margin of the upper materials inwardly over the shoe bottom at the opposite sides of the shank portion of the shoe, and means for effecting such movements of the slides, said supporting and guiding means comprising a guideway for each of the slides, means for yieldingly holding each slide against its guideway as the slides are moved to cause the shank wipers to wipe the lasting margin of the upper inwardly over the shoe bottom, and means acting on said slides to hold the slides rigidly against the guideways at the conclusion of such wiping action and during movement of the shoe support to press the shank portion of the shoe against said wipers.

25. In a machine for lasting the opposite shank portions of a shoe having a support for a shoe including an upper and insole assembled on a last, a pair of shank wipers, said support being mounted for movement in a direction generally parallel to said wipers from an inoperative position remote from said wipers to an operative position to present a shoe thereon to be engaged by said wipers and for movement in a direction perpendicular to said wipers to press the shank portion of the shoe against said wipers, means for thus moving the support, a slide for each of said shank wipers, means for supporting and guiding said slides for movements to cause the shank wipers to wipe the lasting margin of the upper materials inwardly over the shoe bottom at the opposite sides of the shank portion of the shoe, and means for effecting such movements of the slides, said supporting and guiding means comprising a guideway for each of the slides, means for yieldingly holding each slide against its guideway as the slides are moved to cause the shank wipers to wipe the lasting margin of the upper inwardly over the shoe bottom, and means acting on said slides to hold the slides rigidly against the guideways at the conclusion of such wiping action and during movement of the shoe support to press the shank portion of the shoe against said wipers.

26. In a machine for lasting the opposite shank portions of a shoe having a support for a shoe including an upper and insole assembled on a last, a pair of shank wipers, said support being mounted for movement in a direction perpendicular to said wipers to press the shank portion of the shoe against said wipers, means for thus moving the support, a slide for each of said shank wipers, means for supporting and guiding said slides for movements to cause the wipers to wipe the lasting margin of the upper materials inwardly over the shoe bottom at the opposite sides of the shank portion of the shoe, and means for effecting such movements of the slides, said supporting and guiding means comprising a guideway for each of the slides, a spring-pressed plunger arranged to act on each of said slides to hold the slide yieldingly against its guideway as the slides are moved to cause the shank wipers to wipe the lasting margin of the upper inwardly over the shoe bottom, and a roller for engaging each slide to hold it rigidly against its guideway at the conclusion of such wiping action and during movement of the shoe support to press the shank portion of the shoe against said wipers.

27. In a machine for lasting the opposite shank portions of a shoe having a support for a shoe including an upper and insole assembled on a last, a pair of shank wipers, said support being mounted for movement in a direction generally parallel to said wipers from an inoperative position remote from said wipers to an operative position to present a shoe thereon to be engaged by said wipers and for movement in a direction perpendicular to said wipers to press the shank portion of the shoe against said wipers, means for thus moving the support, a slide for each of said shank wipers, means for supporting and guiding said slides for movements to cause the shank wipers to wipe the lasting margin of the upper materials inwardly over the shoe bottom at the opposite sides of the shank portion of the shoe, and means for effecting such movements of the slides, said supporting and guiding means comprising a guideway for each of the slides, a spring-pressed plunger arranged to act on each of said slides to hold the slide yieldingly against its guideway as the slides are moved to cause the shank wipers to wipe the lasting margin of the upper inwardly over the shoe bottom, and a roller for engaging each slide to hold it rigidly against its guideway at the conclusion of such wiping action and during movement of the shoe support to press the shank portion of the shoe against said wipers.

References Cited in the file of this patent

UNITED STATES PATENTS

| | | |
|---|---|---|
| 1,770,976 | Fausse | July 22, 1930 |
| 2,754,529 | Robinson | July 17, 1956 |
| 2,844,831 | Stratton | July 29, 1958 |